United States Patent
Sharma et al.

(10) Patent No.: US 12,010,385 B2
(45) Date of Patent: Jun. 11, 2024

(54) MIXING OF MEDIA CONTENT ITEMS FOR DISPLAY ON A FOCUS AREA OF A NETWORK-CONNECTED TELEVISION DEVICE

(71) Applicant: GOOGLE LLC, Mountain View, CA (US)

(72) Inventors: Rahul Sharma, Mountain View, CA (US); Rashmi Murthy, Saratoga, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/919,931

(22) Filed: Jul. 2, 2020

(65) Prior Publication Data

US 2021/0289261 A1 Sep. 16, 2021

Related U.S. Application Data

(63) Continuation of application No. PCT/US2020/022785, filed on Mar. 13, 2020.

(51) Int. Cl.
*H04N 7/173* (2011.01)
*H04N 21/258* (2011.01)
(Continued)

(52) U.S. Cl.
CPC ... *H04N 21/4668* (2013.01); *H04N 21/25891* (2013.01); *H04N 21/4316* (2013.01);
(Continued)

(58) Field of Classification Search
CPC .......... H04N 21/4668; H04N 21/8126; H04N 21/47202; H04N 21/8166; H04N 21/812;
(Continued)

(56) References Cited

U.S. PATENT DOCUMENTS 8,700,643 B1 * 4/2014 Gossweiler, III .. H04N 21/4828
707/754
8,949,873 B1 2/2015 Bayer et al.
(Continued)

FOREIGN PATENT DOCUMENTS

CN 1386362 12/2002
CN 101283370 A 10/2008
(Continued)

OTHER PUBLICATIONS

International Search Report & Written Opinion dated Aug. 25, 2020 in International Patent Application No. PCT/2020/022785.
(Continued)

*Primary Examiner* — Annan Q Shang
(74) *Attorney, Agent, or Firm* — Brake Hughes Bellermann LLP

(57) ABSTRACT

This application is directed to presenting a unified user interface on a network-connected television device. The unified user interface displays media content recommendations selected and organized based on knowledge of a user (e.g., search queries, search results, watch history, purchase history, physical activities). The unified user interface also includes a focus area for displaying a series of media content items (e.g., an advertisement) sequentially according to a temporal order for the purposes of promoting a media content item, product, event or service. In some implementations, playback of a media content item presented on the unified user interface relies on a collaborative implementation of a corresponding media player application and a media content casting application, particularly when the play involves a restricted mode. The content casting application is enabled to play the media content item at the restrict mode when the media player application does not operate in the restricted mode.

19 Claims, 16 Drawing Sheets

(51) Int. Cl.
*H04N 21/431* (2011.01)
*H04N 21/466* (2011.01)
*H04N 21/472* (2011.01)
*H04N 21/482* (2011.01)
*H04N 21/81* (2011.01)

(52) U.S. Cl.
CPC ... *H04N 21/47202* (2013.01); *H04N 21/4826* (2013.01); *H04N 21/812* (2013.01); *H04N 21/8126* (2013.01); *H04N 21/8166* (2013.01)

(58) Field of Classification Search
CPC ......... H04N 21/4316; H04N 21/25891; H04N 21/4826; H04N 21/431; H04N 21/4728; H04N 21/8173; G06F 16/29; G06Q 30/0251; G06Q 30/0272
See application file for complete search history.

(56) References Cited

U.S. PATENT DOCUMENTS

| | | | |
|---|---|---|---|
| 8,959,177 B1 | 2/2015 | Weston et al. | |
| 9,235,858 B1 | 1/2016 | Singh et al. | |
| 10,521,188 B1 | 12/2019 | Christie et al. | |
| 2004/0040039 A1 | 2/2004 | Bernier | |
| 2006/0062363 A1* | 3/2006 | Albrett | H04N 21/4532 348/E7.071 |
| 2007/0240182 A1 | 10/2007 | Callahan | |
| 2007/0250861 A1 | 10/2007 | Angiolillo et al. | |
| 2008/0172689 A1 | 7/2008 | Feder et al. | |
| 2009/0265747 A1* | 10/2009 | Li | G08B 13/196 725/115 |
| 2010/0205636 A1* | 8/2010 | Coburn | H04N 21/44224 725/46 |
| 2010/0281525 A1* | 11/2010 | Nakajima | H04W 48/14 726/5 |
| 2011/0055871 A1 | 3/2011 | Bi et al. | |
| 2011/0069940 A1* | 3/2011 | Shimy | H04N 5/44543 386/296 |
| 2011/0184807 A1 | 7/2011 | Wang et al. | |
| 2011/0255842 A1 | 10/2011 | Hindle et al. | |
| 2011/0302521 A1* | 12/2011 | Jiang | G06F 16/9535 715/779 |
| 2011/0314419 A1* | 12/2011 | Dunn | G06F 16/9577 715/810 |
| 2012/0023207 A1* | 1/2012 | Gandhewar | H04L 61/5038 709/221 |
| 2012/0054797 A1* | 3/2012 | Skog | H04N 21/42224 725/41 |
| 2012/0158511 A1 | 6/2012 | Lucero et al. | |
| 2012/0260291 A1 | 10/2012 | Wood | |
| 2012/0278725 A1* | 11/2012 | Gordon | H04N 21/25891 715/738 |
| 2012/0291072 A1 | 11/2012 | Maddision et al. | |
| 2013/0262558 A1 | 10/2013 | Wood et al. | |
| 2013/0276031 A1 | 10/2013 | Oh et al. | |
| 2013/0311670 A1* | 11/2013 | Tarbox | H04N 21/2387 709/231 |
| 2014/0053214 A1* | 2/2014 | Walker | H04H 20/26 725/62 |
| 2014/0156364 A1* | 6/2014 | Zalewski | G06F 18/00 382/181 |
| 2014/0208268 A1 | 7/2014 | Jimenez | |
| 2014/0223480 A1 | 8/2014 | Berry et al. | |
| 2015/0074721 A1 | 3/2015 | Fishman et al. | |
| 2015/0189367 A1* | 7/2015 | Schindler | H04N 21/235 725/44 |
| 2015/0193433 A1 | 7/2015 | Dykeman et al. | |
| 2016/0066049 A1 | 3/2016 | Mountain | |
| 2016/0142776 A1 | 5/2016 | Meijer | |
| 2016/0142783 A1 | 5/2016 | Bagga et al. | |
| 2016/0381427 A1* | 12/2016 | Taylor | H04N 21/23424 725/13 |
| 2017/0272824 A1* | 9/2017 | Bunner | H04W 76/14 |
| 2017/0318350 A1 | 11/2017 | Wielgosz | |
| 2018/0012195 A1* | 1/2018 | Nagaraj | G06Q 10/1095 |
| 2018/0063591 A1 | 3/2018 | Newman et al. | |
| 2018/0103281 A1 | 4/2018 | Drake et al. | |
| 2019/0208234 A1* | 7/2019 | Van Brandenburg | H04N 21/234345 |
| 2019/0325114 A1 | 10/2019 | Maughan et al. | |
| 2019/0364319 A1* | 11/2019 | Milford | H04N 21/26258 |
| 2021/0105535 A1 | 4/2021 | Kim et al. | |
| 2021/0144449 A1* | 5/2021 | Cruz Moya | H04N 21/4532 |

FOREIGN PATENT DOCUMENTS

| | | |
|---|---|---|
| CN | 101479687 A | 7/2009 |
| CN | 103348693 A | 10/2013 |
| CN | 104995620 | 10/2015 |
| CN | 105264902 | 1/2016 |
| CN | 105338405 | 2/2016 |
| CN | 106030574 | 10/2016 |
| CN | 106233740 | 12/2016 |
| CN | 107943864 | 4/2018 |
| CN | 108513171 | 9/2018 |
| CN | 108604181 | 9/2018 |
| JP | 2005275740 A | 10/2005 |
| JP | 2011041221 | 2/2011 |
| JP | 2014519648 | 8/2014 |
| JP | 2015504613 | 12/2015 |
| JP | 2016535347 | 11/2016 |
| JP | 2020503586 A | 1/2020 |
| WO | WO 2006123318 | 11/2006 |
| WO | WO 2012030025 | 3/2012 |
| WO | WO 2013115235 | 8/2013 |

OTHER PUBLICATIONS

International Search Report & Written Opinion dated Aug. 25, 2020 in International Patent Application No. PCT/US2020/022787.
International Search Report & Written Opinion dated Nov. 17, 2020 in International Patent Application No. PCT/US2020/022789.
Office Action dated Apr. 14, 2021 in U.S. Appl. No. 16/919,984.
Office Action dated Aug. 17, 2021 in U.S. Appl. No. 16/919,970.
Notice of Allowance dated Oct. 6, 2021 in U.S. Appl. No. 16/919,984.
Examination Report dated Jun. 3, 2022 in EP Patent Application No. 20716679.4.
Examination Report dated Jul. 12, 2022 in EP Patent Application No. 20733053.1.
Office Action dated Jun. 7, 2022 in JP Patent Application No. 2020-540533.
Office Action dated Jun. 7, 2022 in JP Patent Application No. 2020-540561.
Office Action dated Jun. 21, 2022 in JP Patent Application No. 2020-539244.
Office Action dated Jul. 14, 2022 in U.S. Appl. No. 16/919,970.
Serridge, B., "Google Play Helps You Find What You Want to Watch and Where to Watch it", The Keyword, last updated Mar. 27, 2018, pp. 1-5, available at: https://blog.google/products/google-play/google-play-helps-you-find-what-watch-and-where-watch-it/.
Office Action dated Apr. 20, 2023 in CN Patent Application No. 202080001374.9.
Office Action dated Apr. 20, 2023 in CN Patent Application No. 202080001397.X.
Examination Report dated Jul. 12, 2023 in EP Patent Application No. 20716679.4.
Office Action dated Jul. 4, 2023 in JP Application No. 2020-540533.
Office Action dated Aug. 7, 2023 in U.S. Appl. No. 17/670,929.
Grenager, T., et al., "Video Ad Serving Template (VAST) Version 3.0", Technical Report, Interactive Advertising Bureau, Jul. 19, 2012, pp. 1-71.
Office Action dated Jan. 17, 2023 in JP Patent Application No. 2020-540533.
Summons to Attend Oral Proceedings dated Jan. 31, 2023 in EP Patent Application No. 20716369.2.
How to Tech, "Disney+ App Preview App Walkthrough—Disney Plus Review—Disney+ Application Preview Fire TV", YouTube, Nov. 11, 2019, pp. 1, available at: https://www.youtube.com/watch?v=K7vPx9rfN-M.

(56) References Cited

OTHER PUBLICATIONS

Office Action dated Feb. 1, 2022 in U.S. Appl. No. 16/919,970.
Examination Report dated Nov. 4, 2021 in EP Patent Application 20716369 2.
Office Action dated Feb. 15, 2023 in U.S. Appl. No. 17/670,929.
First Office Action with English translation for Chinese Application No. 202080001262.3, mailed Feb. 23, 2024, 22 pages.
Office Action for Japanese Application No. 2023-043281, mailed Apr. 2, 2024, 7 pages.

\* cited by examiner

At a server system that hosts a virtual user domain including a user account: ⟶ 400

Associate the user account with a unified TV application, a plurality of media play applications, and a plurality of user applications, wherein the unified TV application is associated with the network-connected TV device, and the plurality of user applications includes at least an Internet search engine 402

For each of the unified TV application, media play applications and user applications, store respective activity data, including 404

Storing search queries and search results for a plurality of search operations implemented by the Internet search engine from the user account 406

Storing watch information associated with the user account for a subset of the media play applications 408

Storing purchase information associated with the user account for a subset of the user applications 410

Compute a multi-dimensional unified user activity characteristic from the stored activity data 412

Obtain program information associated with the plurality of media play applications, resulting in de-duplicated program information for a plurality of unique programs 414

Identify a similarity level of the first and second program info. 416

In accordance with a determination that the similarity level exceeds a similarity threshold: 418 de-duplicating the first program information of the first media content item and the second program information of the second media content item; and 420 determining that one of the plurality of unique programs is associated with both the first and second media content items 422

In accordance with the user activity characteristic and the program information for the plurality of unique programs, identify an ordered subset of the unique programs to recommend to a user via the unified TV application 424

Enable displaying, via the unified TV application, an ordered sequence of information items corresponding to the ordered subset of the unique programs, each information item representing a respective unique program provided by a corresponding media play application 426

Figure 4

At a server system that hosts a virtual user domain including a user account:

Associate the user account with a unified TV application and a plurality of media play applications 1302

The unified TV application is associated with a network-connected TV device and is configured to enable display of media content on the TV device, and each of the plurality of media play applications is configured to display media content provided by a respective content provider. 1304

Execute the unified TV app. to enable display of a unified user interface on the network-connected TV device, wherein the unified user interface has a focus area configured to display a plurality of focus items 1306

Display the plurality of focus items in the focus area sequentially according to a temporal order, {carousel} wherein each focus item is associated with a respective focus item provider selected from a merchandising module, an advertiser, and a media recommendation engine, and the plurality of focus items includes a first focus item, including: 1308

Sending to a first advertiser server a request for the first focus item, the request including information of a plurality of predefined user interface elements of the focus area of the unified user interface 1310

In response to the request, receiving from the first advertiser server a plurality of media content items associated with the first focus item and consolidating the plurality of media content items to the first focus item for display on the focus area during a time slot corresponding to the first focus item 1312

Figure 13

Device and App Registry 150

User Account: abc@gmail.com —1482

| Device ID | Device Type | Device Manufacturer ID | IP Address |
|---|---|---|---|
| 1 | Chromecast | 1156101356 | 192.68.53.5 |
| 2 | Smoker Detector | 1492463200 | 192.68.53.5 |
| 3 | Nest Camera | B656A04658 | 192.68.53.5 |
| ... | ... | ... | ... |
| 10 | Remote Control | 51A6ZA135B | 192.68.53.5 |
| 11 | Android TV | DOP523JK | 192.68.53.5 |

| App ID | App Type | 1P or 3P | Subscription Info. |
|---|---|---|---|
| 1 | Gmail | 1P | |
| 2 | Google Map | 1P | |
| 3 | Google Assistance | 1P | |
| 4 | YouTube | 1P | |
| 5 | Nest Hello | 1P | |
| 6 | Unified TV App | 1P | ... |
| ... | ... | ... | ... |
| 11 | Netflix | 3P | abc@gmail.com |

Figure 14B

MIXING OF MEDIA CONTENT ITEMS FOR DISPLAY ON A FOCUS AREA OF A NETWORK-CONNECTED TELEVISION DEVICE

RELATED APPLICATIONS

This application is a continuation of and claims priority to International Patent Application No. PCT/US20/22785, filed Mar. 13, 2020, titled "Mixing of Media Content Items for Display on a Focus Area of a Network-Connected Television Device," which is incorporated by reference in its entirety.

This application is related to International Patent Application No. PCT/US20/22787, filed Mar. 13, 2020, titled "Network-Connected Television Devices with Knowledge-based Media Content Recommendations and Unified User Interfaces" and International Patent Application No. PCT/US20/22789, filed Mar. 13, 2020, titled "Media Content Casting in Network-Connected Television Devices." Each of these two applications is incorporated by reference in its entirety.

TECHNICAL FIELD

This application relates generally to display technology, including but not limited to methods and systems for providing knowledge-based media content recommendations, displaying a unified user interface with content-based media recommendations, mixing multiple media content items to be displayed on a focus area, and/or casting controlled media content associated with a network-connected television device.

BACKGROUND

Media display devices are employed to stream a variety of media content (e.g., television programs, movies, live broadcasts, personal videos, etc.) via one or more communication networks. Media display devices include a variety of connected display devices, such as mobile phones, set-top boxes, or connected television devices. The connected television devices are often controlled via remote control interfaces that can be displayed directly on the media display devices or separately on a second screen mobile device (e.g., a tablet computer, laptop, or mobile phone). A user can browse through a list of content items and search for media content on user interfaces displayed on the television devices, while controlling playback of the media content via a dedicated remote device or a second screen mobile device (e.g., a tablet computer, laptop, or mobile phone). However, the list of content items is often organized based on media player applications configured to play the content items in the list.

SUMMARY

This application is directed to presenting a unified user interface with content-based media recommendations on a network-connected television (TV) device (sometimes called a smart TV). The unified user interface is configured to display a plurality of media content recommendations that are selected for a particular user based at least in part on knowledge of that user's interests and activities (e.g., the user's search queries, search results, previous watch history, purchase history, physical activities of the user). In some implementations, the media content recommendations are organized as a plurality of clusters based on one or more categories, such as: content type (e.g., "Action Movies"), viewing history (e.g., "Because You watched Movie ABC"), release time (e.g., "Trending"), and the like. In some implementations, media content provided by different content sources (e.g., action movies from two different streaming services and a broadcast TV channel) can be recommended in the same cluster.

In some implementations, the unified user interface includes a focus area (e.g., a prominently displayed area of the user interface) configured to display a series of media content items (e.g., an advertisement, a movie trailer, a merchandising image) sequentially according to a temporal order for the purposes of promoting a media content item, product or event.

In some implementations, a user initiates playback of a content item from the unified user interface by selecting an icon or thumbnail corresponding to the content item. In some implementations, playback of a media content item selected from the unified user interface is handled by a dedicated application associated with a particular media streaming service or broadcast channel, a cable or over-the-air (OTA) tuner, a web browser, or an internal casting application associated with the connected TV displaying the user interface. In some implementations, playback of a content item is handled collaboratively by a media player application and a local content casting application, particularly when the playback occurs in a restricted mode (e.g., in an age-restricted system context, such as a media player interface customized for children) that is not supported by the media player application. In some implementations where the unified user interface provides both restricted and non-restricted modes and a media player application only supports a non-restricted mode, the media player application is used to play media content when the user interface is in the unrestricted mode and the local casting application is used to play the media content item when the system is in a restricted mode media player.

In various implementations, the unified user interface is coupled with a server system that hosts a virtual user domain including a user account associated with a user of the user interface. Hardware devices and software applications are integrated with each other via the user account in the virtual user domain. In some implementations, the user account is associated with the network-connected TV device and a unified media application is configured to present the unified user interface on the TV device. The user account can also be associated with one or more home devices (e.g., a camera, doorbell, and/or hazard detector), one or more media player devices (e.g., a set-top box and/or associated TV device), one or more assistant device (e.g., speaker assistant and/or display assistant devices), and their corresponding home security, media player and assistant applications. The user account can also be associated with general user applications, e.g., an email application, a social media application, a map application, and an online retailer application.

In some implementations, and only to the extent approved by a user, the server system learns about a user's interests and activities from information reported by the various applications associated with the user's account and, from this information, generates targeted media content recommendations for the user. These recommendations are displayed on the unified user interface of the network-connected TV device that is communicatively coupled to the server system, third-party content providers, electronic program guide (EPG) providers, and advertisement (ads) providers via one or more communication networks.

Specifically, in one aspect, a method of identifying media content items for presentation on a network-connected TV device is implemented at a server system that hosts a virtual user domain including a user account. The method includes associating the user account with a unified TV application, a plurality of media player applications, and a plurality of user applications. The unified TV application is associated with the network-connected TV device, and the plurality of user applications includes at least an Internet search engine. The method includes storing respective activity data for each of the unified TV application, media player applications and user applications, including storing search queries and search results for a plurality of search operations implemented by the Internet search engine from the user account, storing watch information associated with the user account for a subset of the media player applications, and storing purchase information associated with the user account for a subset of the user applications. The method further includes computing a multi-dimensional unified user activity characteristic from the stored activity data, and obtaining program information associated with the plurality of media player applications, resulting in de-duplicated program information for a plurality of unique media programs. The method further includes, in accordance with the user activity characteristic and the program information for the plurality of unique programs, identifying an ordered subset of the unique programs to recommend to a user via the unified TV application, and enabling displaying, via the unified TV application, an ordered sequence of information items corresponding to the ordered subset of the unique programs. Each information item represents a respective unique program provided by a corresponding media player application.

In another aspect, a program presentation method is implemented at a network-connected TV device that is linked to a user account in a virtual user domain hosted by a server system. The program presentation method includes executing a unified TV application to display a unified user interface and obtaining from a server a media recommendation stream including an ordered sequence of selectable information items that corresponds to an ordered set of unique media content items or programs. For each selectable information item, the media recommendation stream includes a respective command to be executed in response to a user selection of the respective selectable information item at the network-connected TV device. The program presentation method further includes displaying a plurality of clusters on the unified user interface. Each cluster includes a subset of the ordered sequence of selectable information items, and a first cluster includes a first selectable information item and a second selectable information item that are concurrently displayed on the unified user interface. The program presentation method further includes in response to a first user selection of the first selectable information item, displaying information of a first media content item provided by a first content provider. The program presentation method further includes in response to a second user selection of the second selectable information item, displaying information of a second media content item provided by a second content provider. The second content provider is distinct from the first content provider.

In yet another aspect, a method of presenting selected content provided by media player applications is implemented at a network-connected TV device linked to a user account in a virtual user domain hosted by a server system. The method includes executing a unified TV application to enable display of a unified user interface on the network-connected TV device. The unified TV application has a normal mode and a restricted mode and is associated with one or more standard media player applications and a local content casting application. The method further includes displaying on the unified user interface a plurality of clusters each of which has a plurality of selectable information items, including in the restricted mode, identifying a content selection criterion, and selecting the plurality of selectable information items from program information associated with the one or more standard media player applications according to the content selection criterion. The method further includes receiving a user action on a first selectable information item, and the first selectable information item corresponds to a first media content item provided in a first media player application by a first content provider. The method further includes in response to the user action on the first selectable information item, displaying via the local content casting application the first media content item corresponding to the first selectable information item on the network-connected TV device in accordance with a determination that the unified TV application operates in the restricted mode and a determination that the first media player application does not operate in the restricted mode, and displaying via the first media player application the first media content item corresponding to the first selectable information item on the network-connected TV device in accordance with a determination that the unified TV application operates in the normal mode.

In yet another aspect, a method of displaying focus content is implemented at a server system hosting a virtual user domain including a user account. The method includes associating the user account with a unified TV application and a plurality of media player applications. The unified TV application is associated with a network-connected TV device and is configured to enable display of media content on the TV device, and each of the plurality of media player applications is configured to display media content provided by a respective content provider. The method further includes executing the unified TV application to enable display of a unified user interface on the network-connected TV device. The unified user interface has a focus area configured to display a plurality of focus items. The method further includes displaying the plurality of focus items in the focus area sequentially according to a temporal order. Each focus item is associated with a respective focus item provider selected from a merchandising module, an advertiser, and a media recommendation engine. The plurality of focus items includes a first focus item. More specifically, the method includes sending to a first advertiser server a request for the first focus item, the request including information of a plurality of predefined user interface elements of the focus area of the unified user interface, and in response to the request, receiving from the first advertiser server a plurality of media content items associated with the first focus item and consolidating the plurality of media content items to the first focus item for display on the focus area during a time slot corresponding to the first focus item.

A non-transitory computer-readable medium has instructions stored thereon, which when executed by one or more processors cause the processors to perform the method of any of the above methods. A computer system includes one or more processors and memory having instructions stored thereon, which when executed by the one or more processors cause the processors to perform the method of any of the above methods.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 4 is an example flow chart of a method of providing knowledge-based media content recommendations to a network-connected TV device in accordance with some implementations.

FIG. 13 is an example flow chart of a method of mixing focus content (including a VAST-based advertisement) on a network-connected TV device in accordance with some implementations.

FIG. 14B is an example device and application registry of a server system that stores information of one or more user accounts managed by the server system and information of user devices and applications associated with each of the one or more user accounts in accordance with some implementations.

Like reference numerals refer to corresponding parts throughout the several views of the drawings.

DESCRIPTION OF IMPLEMENTATIONS

Figure 1:
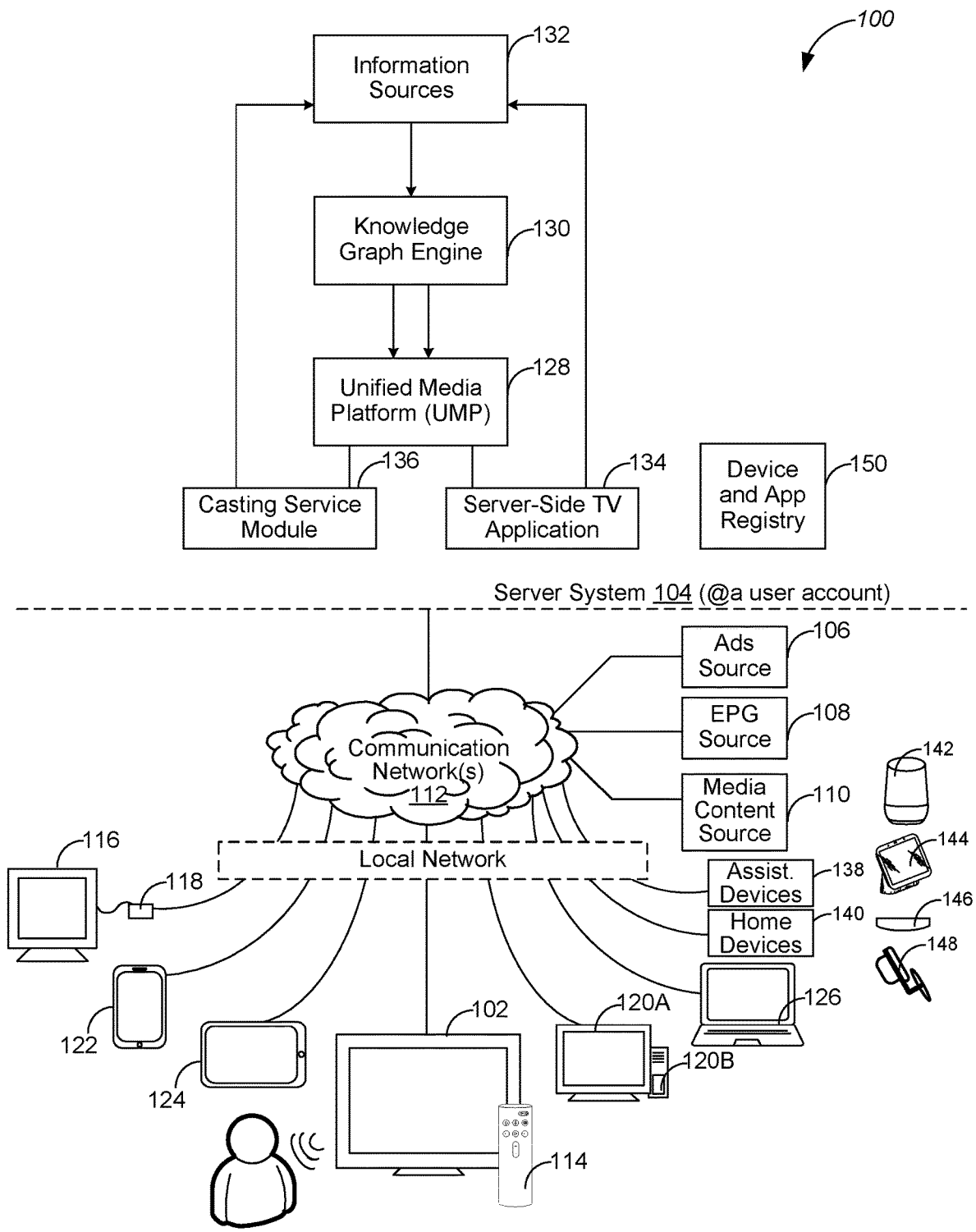
FIG. 1 is an example media environment in which a network-connected TV device, a server system and third-party content sources interact with each other via one or more communication in accordance with some implementations.

In various implementations, a media environment includes a network-connected TV device (also called smart TV device) having one or more processors and memory storing instructions for execution by the one or more processors. The network-connected TV device is linked to a user account in a virtual user domain hosted by a server system. The network-connected TV device executes a unified TV application to display a unified user interface on which media content items provided by various media content providers are selected and displayed for a user of the network-connected TV device. In some implementations, the network-connected TV device is controlled by a dedicated remote control device or a client device having a remote control application for playing the media content items for the user. In some implementations, the dedicated remote control device is disposed in proximity to the TV device. In some implementations, the dedicated remote control device or the client device having the remote control application are not physically in proximity to the TV device, but are associated with the user account maintained at the server system of the media environment.

When the network-connected TV device executes the unified TV application, it obtains from the server system a media recommendation stream. The media recommendation stream includes an ordered sequence of selectable information items that corresponds to an ordered set of unique media content items or programs. The selectable information items in the media recommendation stream are identified for a particular user based at least in part on knowledge of that user of the network-connected TV device (e.g., the user's interests and activities). Specifically, the user account associated with the unified TV application is also associated with a plurality of media player applications and a plurality of user applications (e.g., a search engine, a map application). Activity data of these applications are stored in association with the user account, and used to compute a multi-dimensional unified user activity characteristic (also called a knowledge graph) of the user. In accordance with the user activity characteristic, the ordered sequence of selectable information item is determined from program information associated with the plurality of media player applications and recommended to the user via the unified TV application.

The ordered sequence of selectable information items is displayed on the unified user interface of the network-connected TV device. For each selectable information item, the media recommendation stream includes a respective command to be executed in response to a user selection of the respective selectable information item at the network-connected TV device. The selectable information items are organized into clusters, and arranged without referring to their content providers. That said, two information items associated with media content items provided by distinct content providers may be placed adjacent to each other, thereby allowing the unified user interface to focus on content and be blind to the content providers on its face.

In addition to the selectable information items, the unified user interface optionally displays a plurality of focus items in a focus area sequentially according to a temporal order, i.e., each of the focus items sequentially occupies the entire focus area. The focus area may be located on a top half region of the unified user interface. Each focus item is associated with a respective focus item provider selected from a merchandising module, an advertiser, and a media recommendation engine. The focus item provided by the merchandising module of the server system optionally corresponds to a media content item provided by a TVOD content provider and requiring payment for review. In some implementations, the focus item is an advertisement item provided by an advertiser, and the advertisement item complies with a customized video ad serving template (VAST). Specifically, the TV device sends to the advertiser a request for the focus item including information of predefined user interface elements of the focus area. The advertisement item is aggregated from a plurality of media content items that is provided by the advertiser pursuant to the information of predefined user interface elements.

In some implementations, the unified TV application has a restricted mode in which a content selection criterion is applied to limit media content that is provided via a standard media content application for play on the unified user interface. For example, the content selection criterion may be related to an age-based content rating and defines the restricted mode to be kid-friendly. In the restricted mode, the unified TV application optionally determines whether the standard media content application operates in the restricted mode. In accordance with a determination that the standard media content application operates in the restricted mode, the media content is displayed on the unified user interface via the standard media content application. Alternatively, in accordance with a determination that the third-party media content application does not operate in the restricted mode, the media content is displayed on the unified user interface via a local content casting application that is distinct from the standard media content application.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

FIG. 1 is an example media environment 100 in which a network-connected TV device 102, a server system 104 and third-party content sources 106-110 interact with each other via one or more communication networks 112 in accordance with some implementations. The media environment 100 corresponds to a virtual user domain created and hosted by the server system 104, and the virtual user domain includes a plurality of user accounts. The third-party content sources 106-110 includes ads sources 106, EPG sources 108, and media content sources 110. For each user account, the server system 104 is coupled to the third-party content sources 106-110 and one or more media devices 102 and 116-126, and is configured to recommend and stream media content for review by a user via the respective user account.

Specifically, the one or more media devices associated with the user and the user account are disposed in the media environment 100 to provide the user with media content that is stored at and streamed from a remote content source. The remote content source is optionally a third-party media content source 110 or an internal media source hosted by the server system 104. In some implementations, the one or more media devices include the network-connected TV device 102 which directly streams the media content from the remote content source or integrates an embedded casting unit configured to stream the media content for display to its audience. The network-connected TV device 102 is communicatively coupled to a dedicated remote control device 114 and/or a client device having a remote control application. The dedicated remote control device 114 may be disposed in proximity to the TV device 102 and configured to communicate with the TV device 102 with digitally-coded pulses of infrared signals. Alternatively, in some situations, the dedicated remote control device 114 is configured to communicate with the TV device 102 via the communication networks 112 (i.e., via a local wide area network and/or a wide area network), and does not have to be physically in proximity to the TV device 102.

The network-connected TV device 102 includes one or more processors and memory storing instructions for execution by the one or more processors. The instructions stored on the network-connected TV device 102 include a unified TV application, a local content casting application, and one or more media player applications associated with the third-party content sources 106-110 and/or internal media source associated with the server system 104. These applications are linked to the user account in the virtual user domain of the media environment 100.

Alternatively, in some implementations, the media devices disposed in the media environment 100 include a display device 116 that directly outputs the media content to audience and a casting device 118 that is coupled to and configured to stream the media content to the display devices 116. Examples of the display device 116 include, but are not limited to, television (TV) display devices and music players. Examples of the casting device 118 include, but are not limited to, set-top boxes (STBs), DVD players and TV boxes. In this example shown in FIG. 1, the display device 116 includes a TV display that is hard wired to a DVD player or a set-top box 118. In contrast, in some implementations, the media devices disposed in the media environment 100 include a computer screen 120A that outputs the media content to audience and a desktop computer 120B that streams the media content to the computer screen 120A. In some implementations, the media devices disposed in the media environment 100 includes a mobile device, e.g., a mobile phone 122, a tablet computer 124 and a laptop computer 126. Each of the media devices 118-126 includes one or more media player applications configured to receive and play media content items provided by the third-party content sources 106-110 or internal media source associated with the server system 104.

The server system 104 includes a unified media platform (UMP) 128 configured to manage media content recommendation and streaming to the one or more media devices in the media environment 100. The UMP 128 is configured to receive from the knowledge engine 130 a multi-dimensional unified user activity characteristic associated with a user account and program information of programs or content items provided by the media content sources 110, and generate the media content recommendations that are personalized for the user account. The unified user activity characteristic associated with the user account is obtained from a plurality of information sources 132, e.g., a search engine, a mapping application and an online retailer associated with the user account, each of which provides activity data related to the user account's activities via the respective software program or application. Optionally, the media content recommendations generated by the UMP 128 are presented on the network-connected TV device 102 via a server-side TV application 134, and the server-side TV application 134 enables display of media content on the unified TV application on the TV device 102 in response to a user selection from the media content recommendations. Moreover, the UMP 128 may also function as a centralized media content management module configured to provide the media content recommendations to other media devices 118-126 in addition to the TV device 102.

In some embodiments, activity data associated with the user account is collected from the TV application 134 and casting service module 136 (which are thereby part of the information sources 132), and returned to the knowledge graph engine 130 to update the unified user activity characteristic and media content recommendations associated with the user account.

In some implementations, the UMP 128 also includes a media search engine (e.g., engine 222 in FIG. 2), which is configured to receive a search query from the server-side TV application 134 or casting service module 136, and identify one or more media content items from the program information of programs or content items provided by the media content sources 110.

It is noted that a user account of the virtual user domain hosted by the server system 104 is also associated with one or more devices of other types, e.g., intelligent, multi-sensing, network-connected assistance devices 138 and home devices 140 that are installed in the media environment 100 associated with the user of the network-connected TV device 102. Examples of the assistance devices 138 include a speaker assistance device 142 and a display assistance device 144. The speaker assistance device 142 is capable of collecting audio inputs, recognizing user commands from the audio inputs, and implementing operations (e.g., playing music, answering questions) in response to the user commands. The display assistance device 144 is capable of collecting audio and/or video inputs, recognizing user commands from the audio and/or video inputs, and implementing operations (e.g., playing music, presenting an image or video clip, answering questions) in response to the user commands. Examples of the home devices 140 include one or more of intelligent, multi-sensing, and network-connected: hazard detectors 146, camera systems 148, thermostats, entryway interface devices (e.g., smart doorbells and "smart door locks), alarm systems, microphone devices, wall switches, wall plug interfaces, and appliances (e.g., refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, and motorized duct vents).

Each of the assistance devices 138 and home devices 140 is optionally managed by a unified home device application or a dedicated user application, and linked to the user account in the virtual domain in conjunction with the unified TV application of the network-connected TV device. The activity data collected by the knowledge graph engine 130 may also include data collected by a subset of the assistance devices 138 and home devices 140, thereby allowing the media content recommendations provided to the user to reflect these activity data directly collected from a physical ambient associated with the media environment 100.

In some implementations, the server system 104 includes a device and application registry 150 configured for storing information of one or more user accounts managed by the server system 104 and information of user devices and applications associated with each of the one or more user accounts. For example, the device and application registry 150 stores information of the network-connected TV device 102, remote control device 114, media devices 116-126, assistance devices 138 and home devices 140 and information of the corresponding unified TV application, remote control application, media player applications, unified home device application, and dedicated user applications associated with the assistance devices 138 and home devices 140. Optionally, these media devices, assistance devices and home devices associated with the same user account are distributed across different geographical areas. Optionally, these devices are located at the same physical location. Each media, assistance or home device communicates with another device or the server system 104 using the one or more communication networks 112. The communication networks 112 used can be one or more networks having one or more type of topologies, including but not limited to the Internet, intranets, local area networks (LANs), cellular networks, Ethernet, Storage Area Networks (SANs), telephone networks, Bluetooth personal area networks (PAN) and the like. In some embodiments, two or more devices in a sub-network are coupled via a wired connection, while at least some of devices in the same sub-network are coupled via a local radio communication network (e.g., ZigBee, Z-Wave, Insteon, Bluetooth, Wi-Fi and other radio communication networks).

Figure 2:
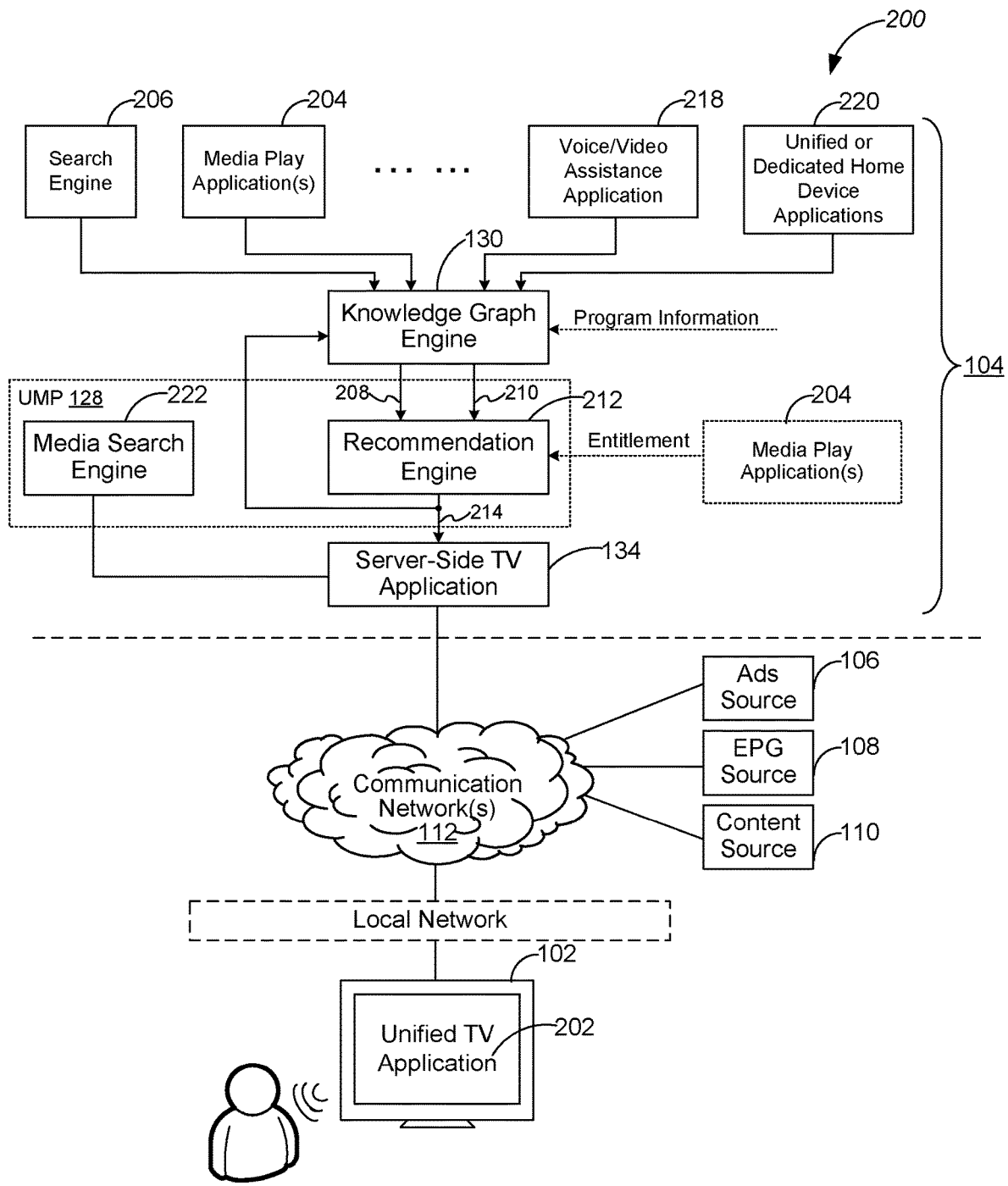
FIG. 2 is an example operating environment in which a server system 104 provides knowledge-based media content recommendations to a network-connected TV device in accordance with some implementations.

FIG. 2 is an example operating environment 200 in which a server system 104 provides knowledge-based media content recommendations to a network-connected TV device 102 in accordance with some implementations. In the example operating environment 200, the server system 104 includes a plurality of information sources 132, a knowledge graph engine 130, a UMP 128 and a server-side TV application 134. The server system 104 hosts a virtual user domain including a user account associated with the server-side TV application 134 and a unified TV application 202 implemented at the network-connected TV device 102. The user account is also associated with a plurality of media player applications 204 and a plurality of user applications, e.g., a search engine 206. The server system 104 stores activity data for each of the unified TV application 202, media player applications 204 and user applications. The knowledge graph engine 130 of the server system 104 computes a multi-dimensional unified user activity characteristic 208 (e.g., concerning user preferences or affinities) from the stored activity data, and obtains program information associated with the plurality of media player applications 204, resulting in de-duplicated program information 210 for a plurality of unique programs (also called media content items). The UMP 128 includes a recommendation engine 212 that is configured to compare the user activity characteristic 208 to the program information 210 for the plurality of unique programs to identify an ordered subset of the unique programs 214 to recommend to a user via the unified TV application 202.

In an example, the knowledge graph engine 130 receives a number of search queries concerning "Star Wars" from the search engine 206 and determines that a user associated with the user account is interested in "Star Wars." The plurality of unique programs associated with the program information are ranked in view of the user's interests, preferences or affinities (i.e., represented by the unified user activity characteristic 208). A certain number of top-ranked unique programs are selected and categorized to clusters. Given the user's interest in "Star Wars" indicated by the search queries, the top-ranked unique programs includes one or more media content items related to "Star Wars," and the clusters include a cluster related to "Star Wars," e.g., "Sci-Fi Movies like Star Wars."

The ordered subset of the unique programs 214 identified by the recommendation engine 212 is represented by an ordered sequence of information items, and the ordered sequence of information items is provided to the server-side TV application 134 and enabled for display via the unified TV application 202 of the network-connected TV device 102. In some situations, the activity data used by the knowledge graph engine 130 and the resulting unified user activity characteristic 208 are constantly changing. The ordered subset of the unique programs 214 may be identified dynamically. For example, the ordered subset of the unique programs 214 is updated periodically or in response to a request by the user of the network-connected TV device 102. In some situations, each unique program in the ordered subset 214 has a life time that is determined based on a respective content type of the respective unique program, and has to be removed from the recommended ordered subsequent after the life time expires. In some implementations, the unified user activity characteristic 208 vary by a time of day and a day of week, so is the ordered subset of the unique program 214 recommended via the unified TV application 202.

The plurality of user applications acts as the plurality of information sources 132 to provide the activity data of a user of the TV device 102, and includes at least an Internet search engine 206. The server system 104 stores and provides, to the knowledge graph engine 130, search queries and search results for a plurality of search operations implemented by the Internet search engine 206 from the user account. Additionally, in some embodiments, the server system 104 stores watch information associated with the user account for a subset or all of the media player applications 204 and purchase information associated with the user account for a subset of the user applications (e.g., an online retailer application). Such watch information and purchase information are provided to the knowledge graph engine 130 in conjunction with the search queries and search results. In some implementations, the plurality of user applications includes a voice or video assistance application 218 associated with the speaker or display assistance device 142 or 144. In some implementations, the plurality of user applications includes a unified home device application and/or dedicated home device applications 220 associated with one or more home devices 140. Activity data collected by these assistance application 218 and home device applications 220 are also stored and provided to the knowledge graph engine 130.

Optionally, one of the media player applications 204 is provided by the server system 104 itself. Optionally, the media player applications 204 are provided by the third-party media content sources 110 distinct and/or remote from the server system 104. In an example, the virtual user domain is associated with a Google user account (e.g., abc@gmail.com). The media player applications 204 include YouTube which is provided by Google and other media player applications (e.g., Netflix, Amazon Prime, Hulu) which are not provided by Google and hosted independently of Google.

In some implementations, the program information associated with the plurality of media player applications 204 includes one or more of: schedule information, a short summary of plot, cast information, rating information, and commentary of current and scheduled programs that are or will be available on each of the media player applications. The program information is optionally provided to the server system 104 in a program catalog by each of the third-party media content sources 110 associated with the plurality of media player applications 204. Optionally, the program information is provided to the server system 104 by the EPG source 108. Alternatively, in some implementations, the program information associated with the plurality of media player applications 204 includes public media information downloaded from a public database that is independent of the user account. It is noted that the program information associated with a media player application may be provided to the server system 104 independently of whether the user account associated with the TV device 102 and the unified TV application 202 subscribes to the media player application and has an access right to media content provided via the media player application.

In some implementations, program information that is provided by different media content sources 110 concerning the same media content item is not identical and can vary to different levels, thereby requiring deduplication of the program information associated with the plurality of media player applications. Specifically, in some implementations, a first media content item is provided by a first media player application and is associated with first program information. A second media content item is provided by a second media player application and is associated with second program information in the second media player application. The second program information is distinct from the first program information. The knowledge graph engine 130 identifies a similarity level of the first and second program information and determines that the similarity level exceeds a similarity threshold. In accordance with the determination, the knowledge graph engine 130 de-duplicates and aggregates the first program information of the first media content item and the second program information of the second media content item, and determines that one of the plurality of unique programs is associated with both the first and second media content items. That said, the first and second media content items provided by two distinct media player applications correspond to the same unique program or media content item. Further, in some implementations, the knowledge graph engine 130 identifies the similarity level of the first and second program information by identifying a first keyword from the first program information and identifying a second keyword from the second program information. The first and second keywords are compared semantically to identify the similarity level of the first and second program information. For example, two program information items are generally consistent, but recite different keywords of "police" and "inspector" that are semantically close. These two program information items correspond to a relatively high similarity level that is higher than the similarity threshold.

In some implementations, in addition to deduplication, the program information associated with the plurality of media player applications is processed to compute a program characteristic for one of the unique programs. The multi-dimensional unified user activity characteristic is then compared to the computed program characteristic to result in a consistency score. The recommendation engine 212 is configured to determine whether the consistency score exceeds a consistency threshold, and identify the one of the unique programs to recommend to the user via the unified TV application when the consistency score exceeds the consistency threshold. Alternatively, in some implementations, to identify each of the ordered subset of the unique programs, the recommendation engine 212 identifies one or more keywords based on the multi-dimensional unified user activity characteristic, and searches the one or more keywords in the de-duplicated program information of the plurality of unique programs to identify the respective unique program in the ordered subset of the unique programs.

In some implementations, the recommendation engine 212 receives entitlement information of a subset of the plurality of media player applications. For each of the ordered subset of the unique programs, the recommendation engine 212 determines that the respective unique program corresponds to a respective media player application to which the user of the network-connected TV device has an access right based on the entitlement information. In accordance with the entitlement information, the user may have the access right of the respective unique program because the user has subscribed to the respective media player application or because the respective unique program is free to review with or without a sign-up. The respective unique program that is free to review includes media content freely available over the air, e.g., via a broadcasting service or IPTV delivered feeds and media content that is made available due to regional regulations or entitlement.

Stated another way, personal preferences shown by the multi-dimensional unified user activity characteristic are used to select a set of unique programs from the unique programs provided by the media content sources 110 and rank the selected set of unique programs. The selected set of unique programs is further filtered according to the entitlement information that indicates whether the user account is entitled to (e.g., has an access right to) media content provided by the media content sources 110 via the corresponding media player applications 204. This entitlement information associated with the media player applications is optionally entered by the user of the unified TV application during an initial application personalization process or an execution stage of the unified TV application 202. Optionally, this entitlement information associated with the media player applications is automatically extracted from the media player applications.

In some implementations, the UMP 128 also includes a media search engine 222 configured to receive a search query from the server-side TV application 134 and identify one or more media content items from the program information 210 of programs or content items provided via the media player applications 204.

The server system 104 has one or more processors and memory storing instructions for execution by the one or more processors. In some implementations, the server system 104 includes a single server computer configured to implementing functions of the knowledge graph engine 130, the recommendation engine 212, the media search engine 222 and the server-side TV application 134. Alternatively, in some implementations, the server system 104 includes two or more separate server computers each of which is configured to implementing functions of one or more of the knowledge graph engine 130, the recommendation engine 212, the media search engine 222 and the server-side TV application 134.

Figure 3:
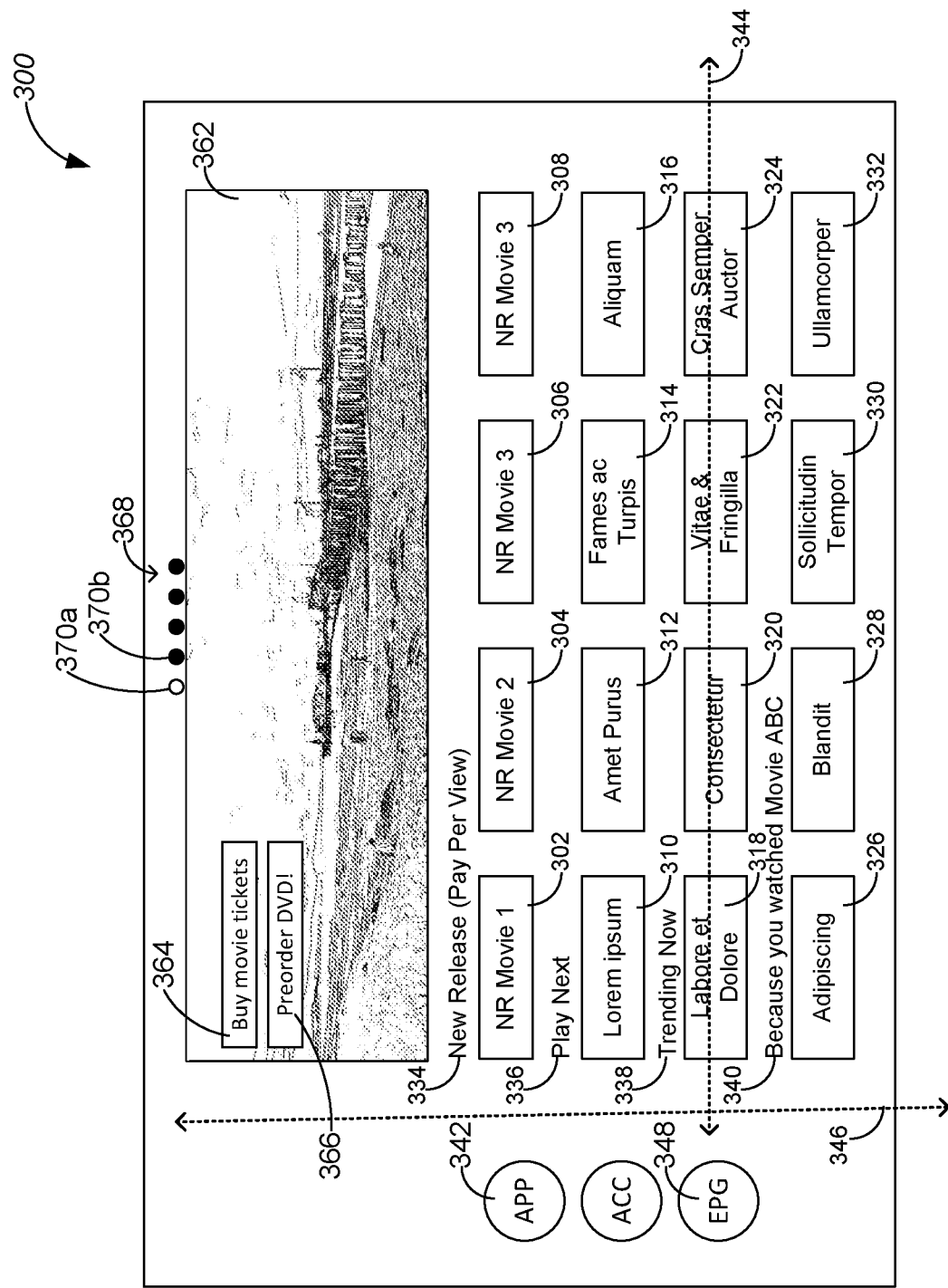
FIG. 3 is an example unified user interface for display on a network-connected TV device in accordance with some implementations.

FIG. 3 is an example unified user interface 300 for display on a network-connected TV device 102 in accordance with some implementations. A unified TV application 202 is executed locally at the network-connected TV device 102 to display the unified user interface 300. As explained above with reference to FIG. 2, the server system 104 identifies an ordered subset of the unique programs 214 based on the user activity characteristic 208 and the program information 210 for the plurality of unique programs. The unified TV application 202 obtains from the server system 104 a media recommendation stream including an ordered sequence of selectable information items 302-332 that corresponds to the identified ordered subset of unique media content items or programs 214. For each selectable information item, the media recommendation stream includes a respective command to be executed in response to a user selection of the respective selectable information item displayed on the network-connected TV device 102.

In some implementations, the corresponding ordered sequence of selectable information items is categorized into an ordered list of clusters 334-340. That said, a plurality of clusters 334-340 is created for display on the unified user interface 300, and physically arranged according to a predefined cluster order. Optionally, these clusters are dynamically created and arranged based on the multi-dimensional unified user activity characteristic 208. In some implementations, the clusters recommended via unified TV application 202 has a certain heterogeneity level, i.e., has a number of different clusters that is larger than a predetermined number. For example, three or more different clusters have to be recommended via the unified TV application 202. Alternatively, in some implementations, the clusters displayed on the unified user interface 300 have a similarity score that is controlled below an inter-cluster similarity threshold for a number of adjacent clusters. This is to avoid the situation where similar clusters and information items are arranged adjacent to each other in highly-related clusters. In some implementations, a benchmark is established to define the inter-cluster similarity threshold across the number of adjacent clusters.

Each cluster includes one or more information items in the ordered sequence that are ordered into an ordered sub-list of the information items in the respective cluster. For each cluster (e.g., a first cluster 338), the respective subset of the ordered sequence of selectable information items (e.g., information items 318-324) are physically arranged according to a predefined information item order that is determined based on the multi-dimensional unified user activity characteristic 208 of a user account associated with the ordered sequence of selectable information items.

Examples of the clusters shown on the unified user interface 300 include "New Release" 334, "Play Next" 336, "Trending Now" 338, "Because You Watched Movie ABC" 340, and "Action Movies." In another example, a cluster is dedicated to a single media player application (e.g., YouTube), and the subset of information items associated with the cluster corresponds to a mixture of shows, movies and TV shoulder content provided by the single media player application. Each of the clusters thereby corresponds to a respective ordered sub-list of information items and is defined according to one or more categories: content type (e.g., "Action Movies"), viewing history (e.g., "Because You watched Movie ABC"), release time (e.g., "Trending"), or content source (e.g., different streaming services and a broadcast TV channel providing action movies). Particularly, the information items in the cluster of "New Release" are determined based on one or more of a content type/format, a content quality, a recency, a popularity, a seasonality, and an application lifecycle associated with media content items or programs corresponding to the information items in "New Release."

In some implementations, media content items corresponding to the information items in the cluster of "New Release" or "Trending Now" are provided by transactional video-on-demand (TVOD) content providers, and a selection of a media content item in "New Release" or "Trending Now" is configured to enable a user interface prompted to the user of the TV device 102 to collect payment for reviewing the media content item. Optionally, this cluster of "New Release" or "Trending Now" is provided as part of the ordered sequence of information items corresponding to the ordered subset of the unique programs 214 that is determined based on the unified user activity characteristic 208. Optionally, this cluster of "New Release" or "Trending Now" is provided to all user accounts as a supplemental to the ordered sequence of information items corresponding to the ordered subset of the unique programs 214, independently of the unified user activity characteristic 208 of an individual user account.

In some implementations, media content items corresponding to the information items in the cluster of "Action Movies" are provided by subscription video-on-demand (SVOD) content providers. A selection of a media content item in this cluster is configured to enable a media content item page (also called a summary page, e.g., page 600 in FIG. 6A) or initiate display of the media content item without soliciting instant payment. Further, in some implementations, a media content item corresponding to an information item in the cluster of "Play Next" is optionally provided by a SVOD or TVOD content provider. In response to a selection of a media content item in this cluster of "Play Next," the TV device 102 resumes displaying the media content item, allowing the user of the TV device 102 to have a one-click access to continue watching a favorite show or movie.

For each cluster on the unified user interface 300, part or all of the ordered sub-list of information items is displayed depending on a total number of information items the respective sub-list has, a size of each information item, and an available display space associated with the respective cluster. In some implementations, each of the ordered subset of the unique programs 214 is distinct from any other unique programs of the ordered subset of the unique programs 214. Any two of the information items 302-332 displayed in the unified user interface 300 are distinct from each other. In some situations, any two of the information items 302-332 displayed in the same cluster of the unified user interface 300 are distinct from each other. Alternatively, in some situations, two of the information items 302-332 may be identical, but are recommended in different clusters, e.g., the information item 310 associated with "Downton Abbey" shows up in both a cluster of "Play Next" 336 and a cluster of "Drama."

In some implementations, the unified user interface 300 includes an application affordance item 342 distinct from the ordered list of clusters and corresponding selectable information items displayed therewith. In response to a user action on the affordance item 342 (e.g., a selection of the item 342 via the remote control device 114), the unified TV application 202 updated the unified user interface 300 with a page of information items each of which represents a respective media player application 204. In some implementation not shown in FIG. 3, the unified user interface 300 further includes an alternative cluster of information items each of which represents a respective one of the plurality of media player applications 204.

In some implementations, the unified user interface 300 includes an EPG affordance item 348. In response to a user action on the affordance item 348 (e.g., a selection of the item 348 via the remote control device 114), the unified TV application 202 displays a unified EPG page that includes a timetable of a plurality of content items and programs that are provided by broadcasting services (e.g., TV, cable, satellite, YouTube) and organized in a temporal order. The content items and programs are selected at least partially based on a location of the network-connected TV device 102. In some implementations, the plurality of content items and programs are also determined by comparing the multi-dimensional unified user activity characteristic 208 and de-duplicated program information corresponding to media content items and programs provided by the broadcasting services.

The information items 302-332 are provided by more than one media content source 110, but are organized and displayed on the unified user interface 300 based on content (not media content sources) of the media content items or programs 214 recommended by the recommendation engine 212 of the server system 104. Specifically, each cluster displayed on the unified user interface 300 includes a subset of the ordered sequence of selectable information items. A first cluster 338 includes a first selectable information item 318 and a second selectable information item 320. The first and second selectable information items 318 and 320 of the first cluster 338 are concurrently displayed on the unified user interface 300. In response to a first user selection of the first selectable information item 318, the TV device 102 displays information of a first media content item provided by a first content provider. In response to a second user selection of the second selectable information item 320, the TV device 102 displays information of a second media content item provided by a second content provider. The second content provider is distinct from the first content provider although information of the first and second content providers is optionally hidden on the unified user interface 300 which shows the clusters 334-340 and the selectable information items 302-332.

In some embodiments, each of the first and second content providers is selected from a broadcasting television service, a broadcasting satellite service, a cable service, a subscription video-on-demand (SVOD) content provider, a transactional video-on-demand (TVOD) content provider, an ad-based video-on-demand (AVOD) service, and a replay and time-shifted content playback source. Optionally, the first or second content provider relies on a tuner-based delivery of over-the-air media content. Optionally, the first or second content provider delivers live TV streams based on Internet Protocol televisions (IPTV) or other Internet-delivered linear, live or synthetic-live content sources, and the first or second content provider is an Internet-based live streaming service. If one of the information item 302-332 corresponds to a broadcasting television service (e.g., NBC, ABC, ESPN), a unique broadcast program corresponding to the one of the information item 302-332 is permitted to be shown at a location of the TV device 102 in compliance with a geographical limitation associated with the broadcasting television service.

It is noted that the unified TV application 202 is associated with a user account of a virtual user domain hosted by the server system 104. In some implementations, the first content provider is associated with a first media player application, and the first media player application is optionally associated with the user account of the virtual user domain hosted by the server system 104. In some implementations, the second content provider is associated with a second media player application, and the second media player application is optionally associated with the user account of the virtual user domain hosted by the server system 104.

In some situations, the first cluster 338 has more selectable information items than a number of slots on a corresponding space of the unified user interface 300 allocated to the first cluster 338. The subset of selectable information items corresponding to the first cluster 338 is physically arranged and configured to move along a first axis 344 of the unified user interface 300, such that different information items in the subset of selectable information items corresponding to the first cluster 338 can be displayed on the unified user interface 300 and recommended to the user of the TV device 102. Specifically, a first user action on the information item 318 (e.g., a user press on a "Previous" button on the remote control device 114) can enable the information items 318-322 to shift right by one slot to cause the information item 324 to exit the unified user interface 300 and a new information item associated with the first cluster 338 to enter the unified user interface 300. Likewise, a second user action on the information item 324 (e.g., a user press on a "Next" button on the remote control device 114) can enable the information items 320-324 to shift left by one slot to cause the information item 318 to exit the unified user interface 300 and another new information item associated with the first cluster 338 to enter the unified user interface 300. When one of the first and second user actions is continuously applied, a start or end information item in the first cluster 338 is displayed. When this happens, the one of the first and second user actions optionally does not change the information items displayed on the unified user interface 300 or continues to display the end or the start of the subset of selectable information items in the first cluster 338 as the new information item following the start or end information item, respectively.

Further, in some implementations, a plurality of clusters are distributed along a second axis 346 of the unified user interface 300, and includes a first subset of clusters and a second subset of clusters. The first subset of clusters may be moved out of the unified user interface, and the second subset of clusters may be moved into the unified user interface along the second axis. For example, the first subset of cluster includes the cluster 334. A third user action (e.g., a user press on a "Up" button on the remote control device 114) on one of the information items 302-308 can enable the clusters 334-338 to shift down by one slot to cause the cluster 340 to exit the unified user interface 300 and a new cluster preceding the cluster 334 to enter the unified user interface 300 from a top edge. Likewise, a fourth user action (e.g., a user press on a "Down" button on the remote control device 114) on one of the information items 326-332 can enable the clusters 336-340 to shift up by one slot to cause the cluster 334 to exit the unified user interface 300 and another new cluster following the cluster 340 to enter the unified user interface 300. When one of the third and fourth user actions is continuously applied, a top or bottom cluster of the plurality clusters is displayed. When this happens, the one of the third and fourth user actions optionally does not change the clusters displayed on the unified user interface 300 or continues to display the bottom or top cluster of the plurality of clusters as the new cluster following the top or bottom cluster, respectively.

FIG. 4 is an example flow chart of a method 400 of providing knowledge-based media content recommendations to a network-connected TV device 102 in accordance with some implementations. Method 400 is performed by a server system 104 and is, optionally, governed by instructions that are stored in a non-transitory computer readable storage medium and that are executed by one or more processors of the server system 104. Each of the operations shown in FIG. 4 may correspond to instructions stored in a computer memory or non-transitory computer readable storage medium (e.g., a memory 1406 of the server system 104 in FIG. 14A). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the method 400 may be combined and/or the order of some operations may be changed.

The server system 104 hosts a virtual user domain including a user account. The server system 104 associates (402) the user account with a unified TV application 202, a plurality of media player applications 204, and a plurality of user applications. The unified TV application 202 is associated with the network-connected TV device 102, and the plurality of user applications includes at least an Internet search engine 206. For each of the unified TV application, media player applications and user applications, the server system stores (404) respective activity data. Specifically, the server system 104 stores (406) search queries and search results for a plurality of search operations implemented by the Internet search engine 206 from the user account, stores (408) watch information associated with the user account for a subset of the media player applications 204, and stores (410) purchase information associated with the user account for a subset of the user applications. A multi-dimensional unified user activity characteristic 208 is thereby computed (412) from the stored activity data.

The server system 104 also obtains (414) program information associated with the plurality of media player applications 204, resulting in de-duplicated program information 210 for a plurality of unique programs. In some implementations, a first media content item is provided by a first media player application and is associated with first program information, and a second media content item is provided by a second media player application and is associated with second program information in the second media player application. The server system 104 identifies (418) a similarity level of the first and second program information. In accordance with a determination (418) that the similarity level exceeds a similarity threshold, the server system 104 de-duplicates (420) the first program information of the first media content item and the second program information of the second media content item, and determines (422) that a unique program is associated with both the first and second media content items In accordance with the user activity characteristic 208 and the program information 210 for the plurality of unique programs, the server system 104 identifies (424) an ordered subset of the unique programs 214 to recommend to a user via the unified TV application 202. The server system 104 enables (426) displaying, via the unified TV application 202, an ordered sequence of information items (e.g., items 302-332) corresponding to the ordered subset of the unique programs 214. Each information item represents a respective unique program or media content item provided by a corresponding media player application 204.

Figure 5:
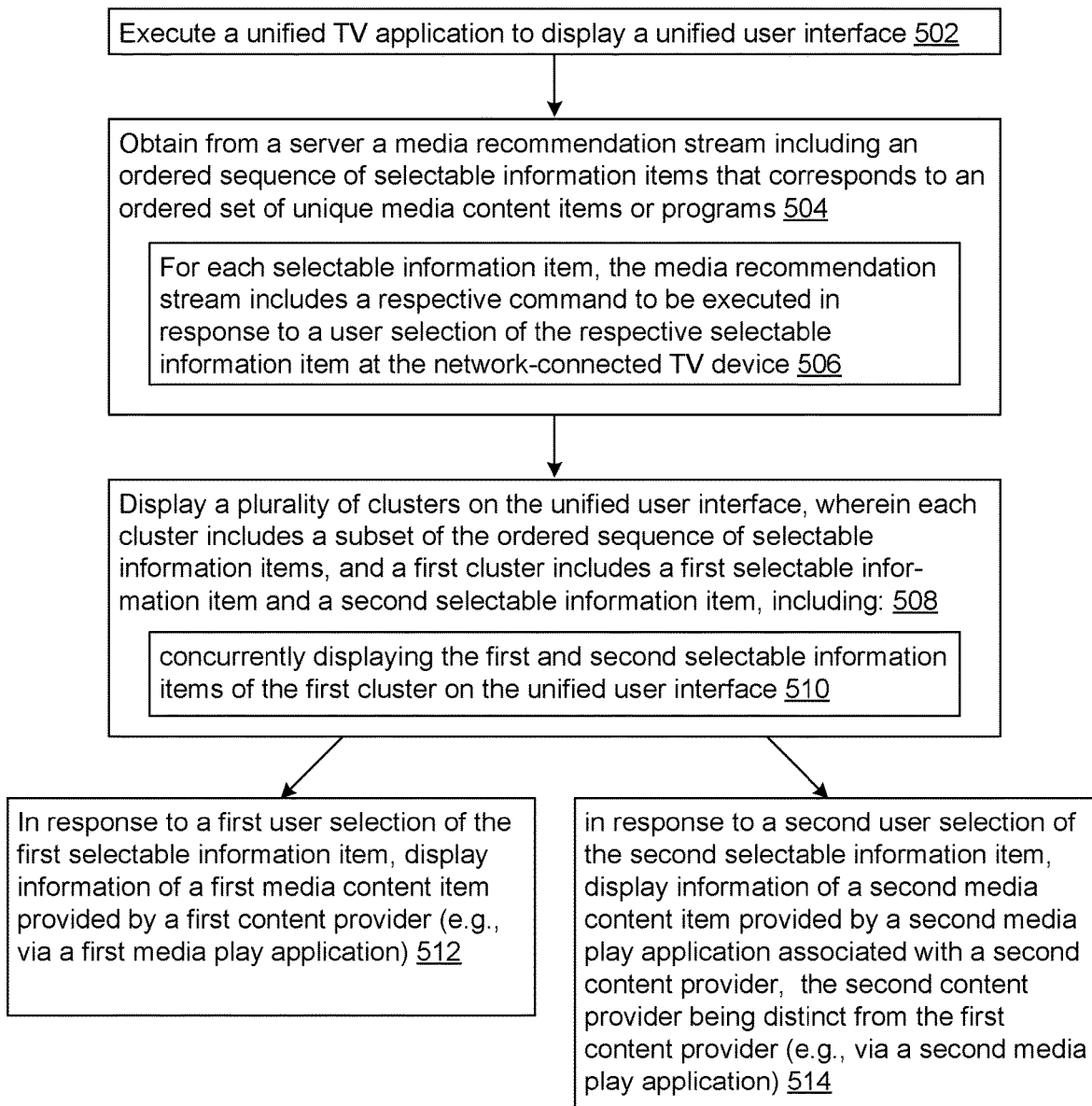
FIG. 5 is an example flow chart of a method of presenting program information on a network-connected TV device in accordance with some implementations.

FIG. 5 is an example flow chart of a method 500 of presenting program information on a network-connected TV device 102 in accordance with some implementations. Method 500 is performed by the network-connected TV device 102 and is, optionally, governed by instructions that are stored in a non-transitory computer readable storage medium and that are executed by one or more processors of the network-connected TV device 102. Each of the operations shown in FIG. 5 may correspond to instructions stored in a computer memory or non-transitory computer readable storage medium (e.g., a memory 1506 of the network-connected TV device 102 in FIG. 15). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the method 500 may be combined and/or the order of some operations may be changed.

The network-connected TV device 102 is linked to a user account in a virtual user domain hosted by a server system 104. The network-connected TV device 102 executes (502) a unified TV application 202 to display a unified user interface 300. A media recommendation stream is obtained (504) from the server system 104, and includes an ordered sequence of selectable information items 302-332 that corresponds to an ordered set of unique media content items or programs 214. For each selectable information item, the media recommendation stream includes (506) a respective command to be executed in response to a user selection of the respective selectable information item at the network-connected TV device 102.

The network-connected TV device 102 displays (508) a plurality of clusters on the unified user interface 300. Each cluster includes (510) a subset of the ordered sequence of selectable information items 302-332. A first cluster 338 includes a first selectable information item 318 and a second selectable information item 320. The first and second selectable information items 318 and 320 of the first cluster 338 are concurrently displayed (510) on the unified user interface 300. In some embodiments, information of content providers associated with the first and second selectable information times is hidden on the unified user interface 300 displaying the first and second selectable information items in the first cluster 338.

In response to a first user selection of the first selectable information item, the network-connected TV device 102 displays (512) information of a first media content item provided by a first content provider (e.g., via a first media player application associated with the first content provider). In response to a second user selection of the second selectable information item, the network-connected TV device 102 displays (514) information of a second media content item provided by a second content provider (e.g., via a second media player application associated with the second content provider). The second content provider is distinct from the first content provider. In some situations, displaying the information of the first media content item includes initiating playback of the first media content item provided by the first content provider from the first media player application directly, and displaying the information of the second media content item includes initiating playback of the second media content item provided by the second content provider from the second media player application directly. Alternatively, in some situations, the information of the first and second media content items is displayed on their respective media content item pages (e.g., page 600 in FIG. 6A) via the unified TV application 202.

Figure 6A:
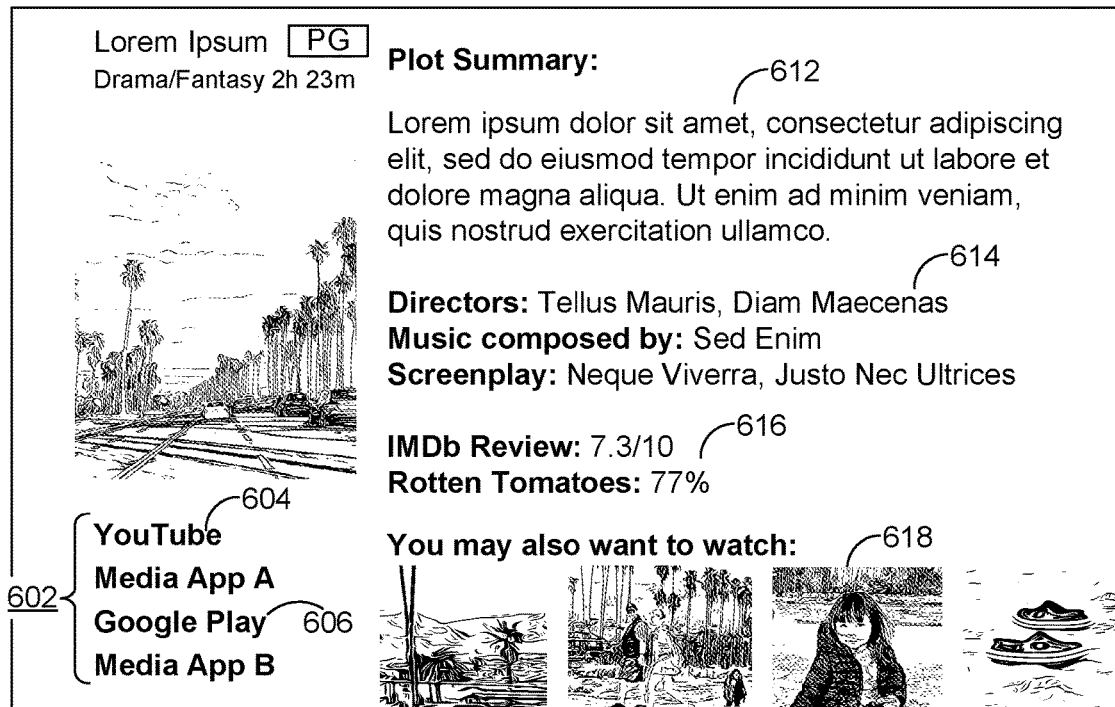
FIGS. 6A and 6B are two example media content item pages displayed on a network-connected TV device in accordance with some implementations, respectively.
Figure 6B:
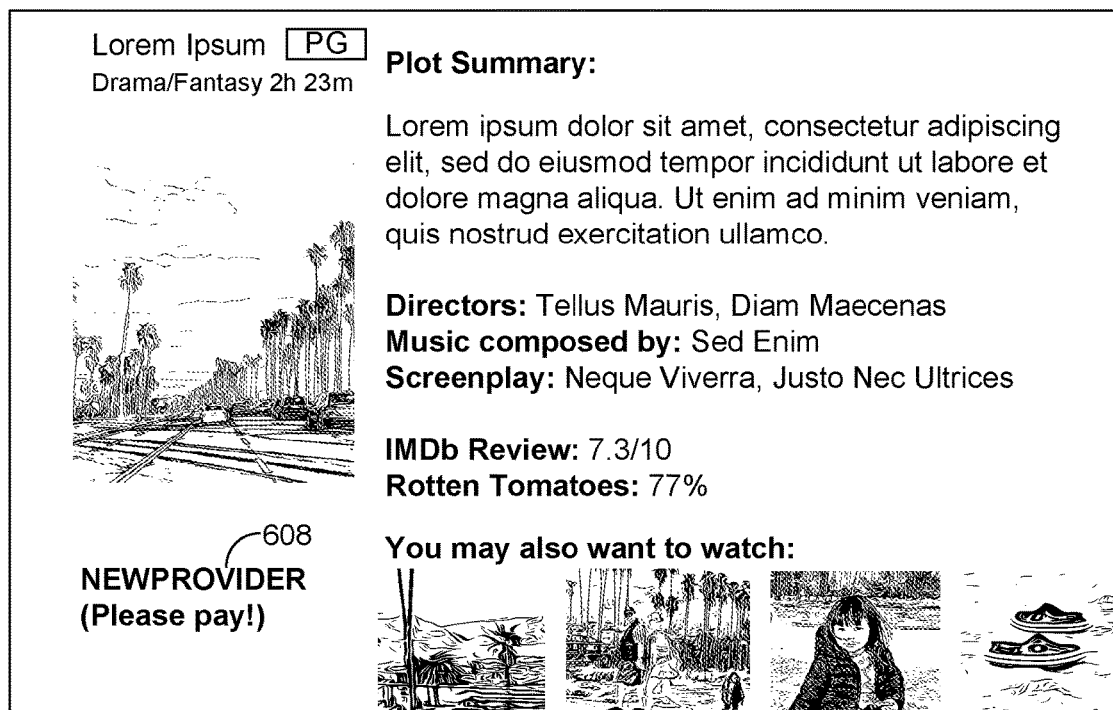

FIGS. 6A and 6B are two example media content item pages 600 and 650 displayed on a network-connected TV device 102 in accordance with some implementations, respectively. In some implementations, the media content item page 600 is displayed to present information of a first media content item provided by a first media player application associated with a first content provider in response to a user selection of a selectable information item (e.g., item 318) in the unified user interface 300. The information of the first media content item includes one or more of: schedule information, a short summary of plot 612, cast information 614, rating information 616, and commentary of the first media content item. Optionally, the information of the first media content item includes one or more recommendations 618 related to the first media content item.

A list of content providers 602 that provide the first media content item is displayed on the media content item page 600. The first content provider 604 is listed at the top of the list of content providers 602 and has a highest priority thereon. The user account associated with the unified TV application 202 has subscribed to a subset or all of the content providers in the list 602. In some implementations, the user account has subscribed to at least the first content provider 604, thereby allowing the recommendation engine 212 to rely on entitle information of the first content provider 604 and add the first content item into the ordered sequence of selectable information items provided to the network-connected TV device 102.

Further, in some situations, the list of content providers 602 includes a second content provider 606, which also provides the first media content item, and the first content provider 604 has a higher priority than the second content provider 606 on the list of content providers 602 that provide the first media content item. On the other hand, it is noted that a distinct media content item page may be displayed to present information of a second media content item in response to a user selection of a distinct selectable information item (e.g., item 320) in the unified user interface 300. A distinct list of content providers is displayed with the second content provider 606 listed at the top of the distinct list of content provider in association with the second media content item.

Referring to FIG. 6B, in some implementations, the media content item page 650 is displayed to present information of the first media content item provided by the first media player application associated with the first content provider in response to the user selection of the selectable information item (e.g., item 318) in the unified user interface 300. The user account does not have subscription to the first media player application, and the media content item page 650 includes an affordance item 608 linked to the first media player application to allow the user account to subscribe to service of the first content provider in response to a user action on the affordance item 608. In an example, the first media content item is relatively new, e.g., has recently stopped from being shown in theaters and started to be distributed by a TVOD content provider, and the affordance item 608 is linked to a Uniform Resource Locator (URL) associated with the first media player application where review of the first media content item is supported on a Pay-Per-View basis.

Figure 7:
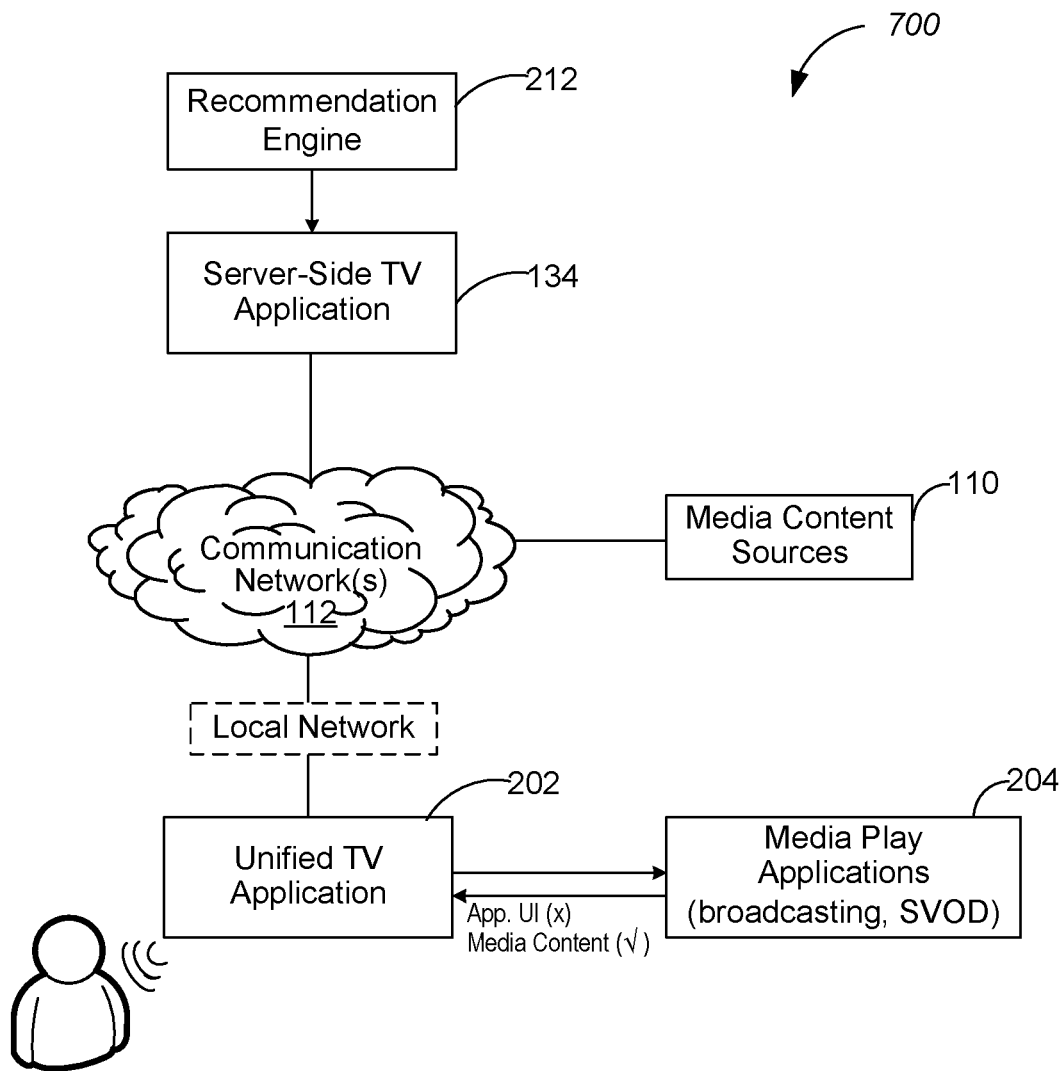
FIG. 7 is an example operating environment where a unified TV application and media player applications collaboratively play a media content item on a network-connected TV device 12 in accordance with some implementations.

FIG. 7 is an example operating environment 700 where a unified TV application 202 and media player applications 204 collaboratively play a media content item on a network-connected TV device 102 in accordance with some implementations. Both the unified TV application 202 and media player applications 204 are executed by the network-connected TV device 102. Playback of the media content item starts in the unified TV application 202. In some situations, playback of a first media content item provided by a first content provider from a first media player application is initiated directly in response to a user action on a corresponding selectable information item 318 displayed on a unified user interface 300. Alternatively, in some situations, playback of the first media content item is initiated from a corresponding media content item page 600, e.g., in response a user selection of a media content provider from the list of media content providers 602.

Upon initiation of the playback of the first media content item, the unified TV application 202 relies on the first or other selected media player application 204 to play the first media content item. In some implementations, although the first media content item is played by the first media player application, user interface elements of the first media player application are bypassed and stopped from being displayed to the user of the network-connected TV device 102. These bypassed user interface elements includes those associated with a home user interface of the first media player application. In contrast, alternative user interface features may not be skipped, and examples of these un-skipped user interface features include a splash image frame indicating that the first media item is provided by the first media content provider. By bypassing the user interface elements of the first media player application, the unified TV application 202 and media player applications 204 are integrated together seamlessly to enable playback of the first media content item without requiring user intervention to switch among these two applications.

Figure 8:
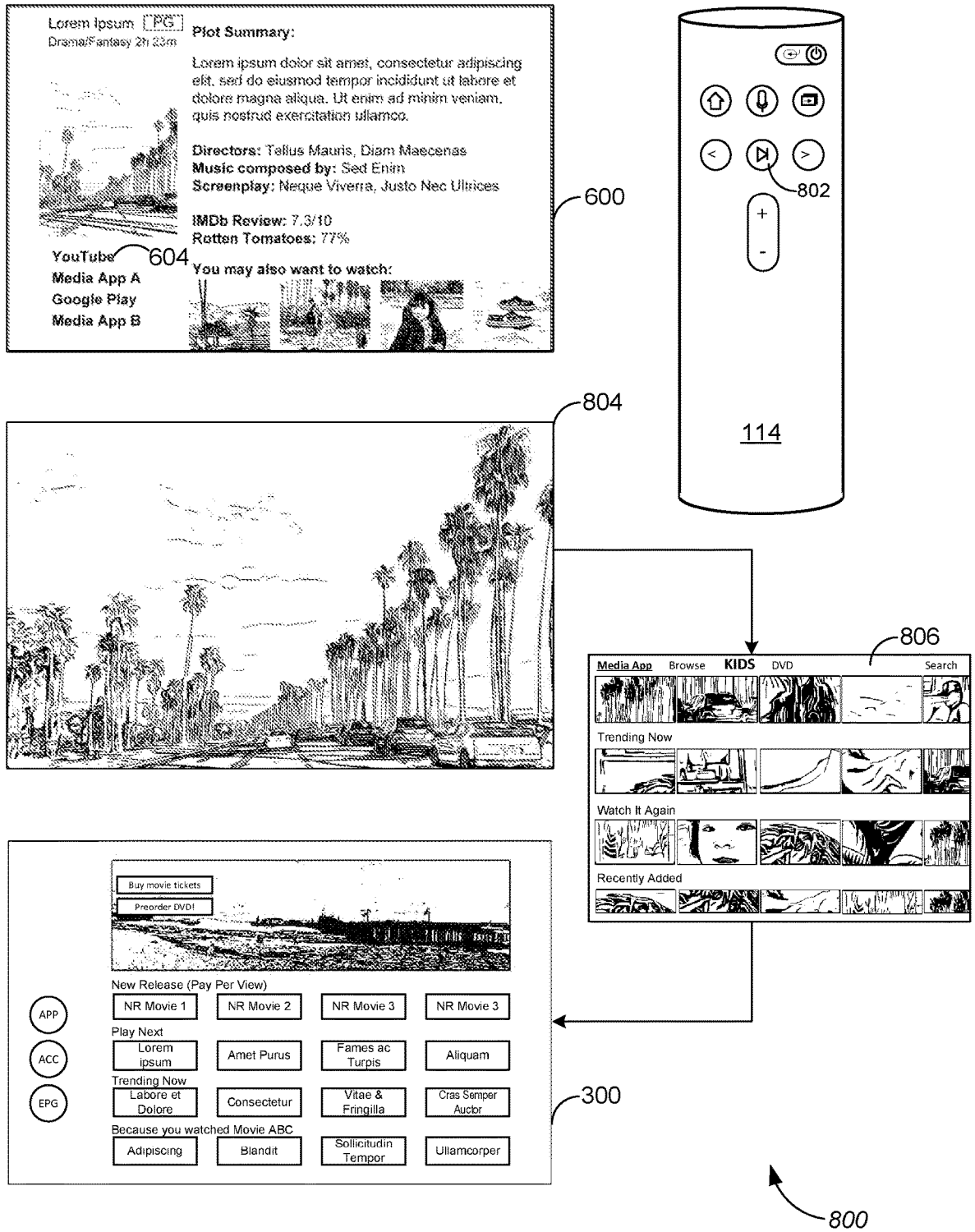
FIG. 8 is an example sequence 800 of user interfaces that are displayed on a network-connected TV device sequentially in response to user actions on a remote control device coupled to the network-connected TV device in accordance with some implementations.

FIG. 8 is an example sequence 800 of user interfaces that are displayed on a network-connected TV device 102 sequentially in response to user actions on a remote control device 114 coupled to the network-connected TV device 102 in accordance with some implementations. When a media content item page 600 (also called a summary page) is displayed for a first media content item on the TV device 102, a first media content provider 604 is selected from the list of media content providers 602 by a first user action with an indication of the first media content provider (e.g., by way of pressing a play button 802 of the remote control device 114). In response to the user action, the first media content item is provided by the first media content provider 604 and played on a media player interface 804 via a first media player application associated with the first media content provider 604. The media player application is executed and hidden in the background to enable playback of the first media content item.

In some implementations, a user request is received to stop the playback of the first media content item on the media player interface 804 enabled by the first media player application. In response to the user request to stop the playback of the first media content item, a home user interface 806 of the first media player application is displayed, and the network-connected TV device 102 operates in a media environment managed by the first media player application. The user of the network-connected TV device 102 may exit the media environment by selecting an exit affordance item on the home user interface 806 of the first media player application or pressing one or more predefined shortcut buttons of the remote control device 114.

Alternatively, in some implementations, in response to the user request to stop the playback of the first media content item on the media player interface 804, display control is directly returned to the unified TV application 202 associated with the network-connected TV device 102. That said, in response to the user request, the network-connected TV device 102 displays the media content item page 600 of the first media content item or the plurality of clusters on the unified user interface 300 via the unified TV application 202. By these means, involvement of the first media player application can be entirely invisible to the user of the network-connected TV device 102, thereby allowing the media player applications 204 to be seamlessly integrated within the unified TV application 202.

Figure 9:
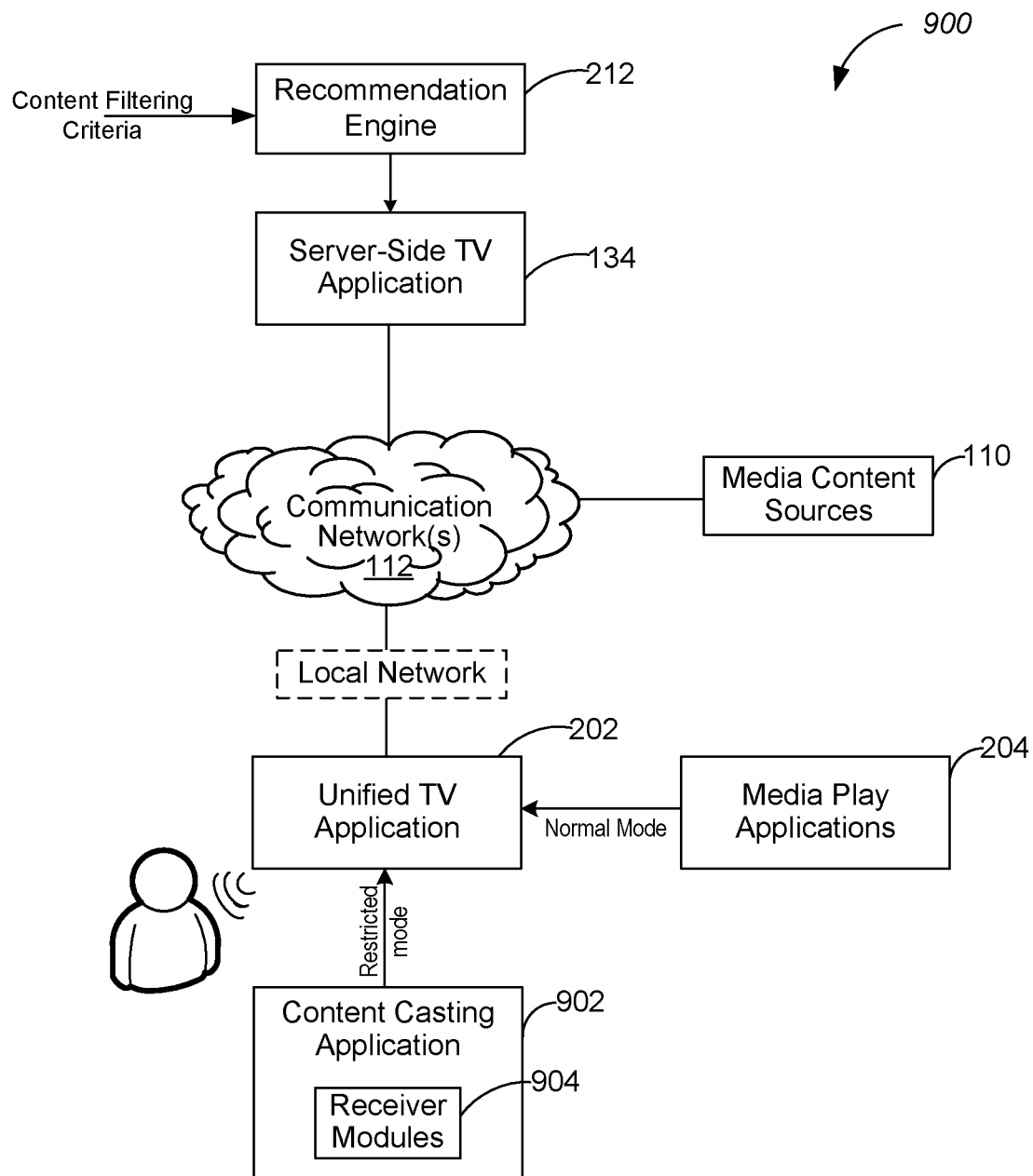
FIG. 9 is an example operating environment in which a unified TV application, media player applications and a content casting application of a network-connected TV device collaboratively enable playback of a media content item in accordance with some implementations.

FIG. 9 is an example operating environment 900 in which a unified TV application 202, media player applications 204 and a content casting application 902 of a network-connected TV device 102 collaboratively enable playback of a media content item in accordance with some implementations. The media player application 204 is a dedicated application associated with a particular media streaming service or broadcast channel, a cable or over-the-air (OTA) tuner, a web browser. The content casting application 902 is internal to the connected TV device 102 executing the unified TV application 202. The network-connected TV device 102 has a normal mode and a restricted mode, and the restricted mode is associated with a content selection criterion. In the normal mode, media content allowed to be played via the unified TV application 202 is selected from media content provided by each media content source 110 associated with the media player applications 204 without any limitation other than a user account's entitlement (i.e., right to access the media content as permitted by a subscription). In contrast, in the restricted mode, the media content allowed to be played via the unified TV application 202 is selected from the media content provided by each media content source 110 associated with the media player applications 204 according to the content selection criterion, in addition to the user account's entitlement. As such, implementation of the restricted mode involves operations on both a server side and a TV device side.

On the server side, the recommendation engine 212 compares a user activity characteristic 208 to a program information 210 for a plurality of unique content items or programs to identify an ordered subset of the unique programs 214 to recommend to a user in the normal mode. In the restricted mode, during the course of obtaining the ordered subset of unique programs 214, the recommendation engine 212 applies the content filtering criterion in conjunction with the user activity characteristic 208 and other filtering conditions (e.g., entitlement information of the media player applications 204), if any. That said, in the restricted mode, the ordered subset of unique programs 214 is determined at least partially based on the content filtering criterion. Selectable information items displayed on the TV device 102 correspond to the ordered subset of unique programs 214, and therefore, are selected from program information 210 associated with one or more media player applications 204 according to the content selection criterion.

On the TV device side, the unified TV application 202 is executed to enable display of a unified user interface 300 on the network-connected TV device 102. In the normal mode, the unified TV application 202 does not impose any limitation related to the content selection criterion on the media content provided via the media player applications 204, and the media player applications 204 are therefore called upon by the unified TV application 202 to play the media content. Conversely, in the restricted mode, the content selection criterion is applied via the unified TV application 202. The unified TV application 202 receives a user action on a first selectable information item on the unified user interface 300. The first selectable information item corresponds to a first media content item provided in a first media player application by a first content provider. In response to the user action on the first selectable information item, the unified TV application 202 determines that the unified TV application operates in the restricted mode and that the first media player application does not operate in the restricted mode, and the local content casting application is called upon by the unified TV application 202 to display the first media content item corresponding to the first selectable information item on the network-connected TV device 102.

Alternatively, in some implementations, the unified TV application 202 determines that the unified TV application operates in the restricted mode and that the first media player application can operate in the restricted mode, and the first media player application is called upon by the unified TV application 202 to display the first media content item corresponding to the first selectable information item on the network-connected TV device 102. In the restricted mode, the media player applications 204 have a priority over the content casting application 902 which is called upon only when the media player application 204 is not capable of operating in the restricted mode. The content casting application 902 is available locally to function on behalf of the media player application 204 that cannot comply with the content selection criterion.

In some implementations, a media player application 204 is associated with a respective third-party media content source 110 independently of the unified TV application that is configured to introduce the content selection criterion to limit the media content provided via the respective media player application. Alternatively, in some implementations, a media player application 204 is associated with the server system 104 that also implements the unified TV application 202. Further, in some implementations, the content casting application 902 includes a plurality of media receiver modules 904 corresponding to the plurality of media player applications 204. In the restricted mode, the unified TV application 202 applies the content selection criterion on media content that is provided by a media content source 110 associated with a media player application 204 via a respective media receiver module 904 of the content casting application 902.

Figure 10A:
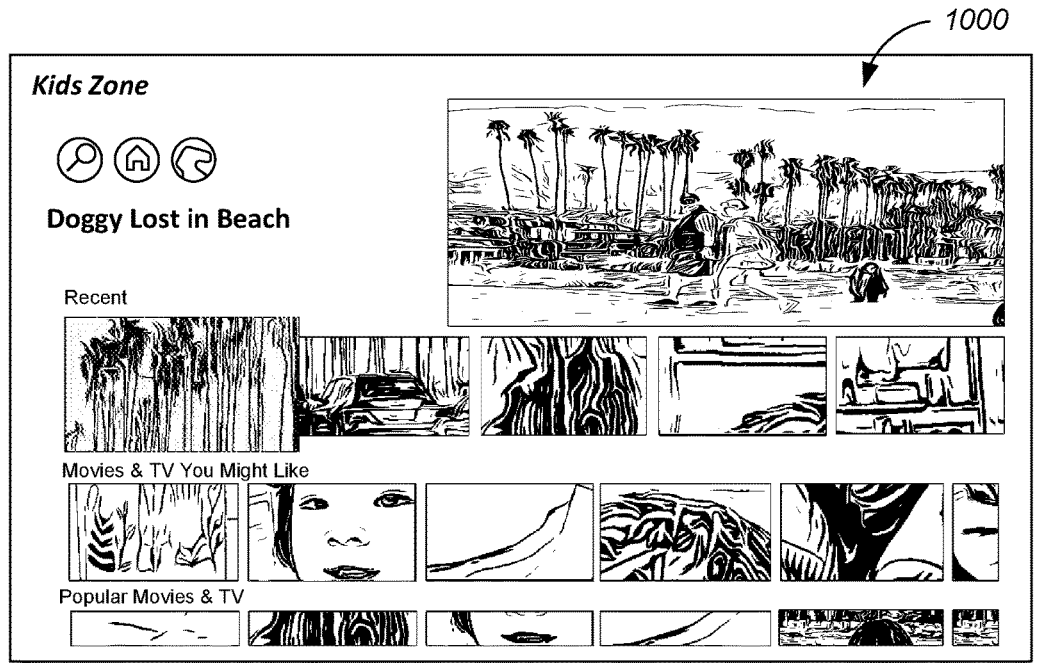
FIG. 10A is an example unified user interface displayed on a network-connected TV device at a restricted mode in accordance with some implementations.
Figure 10B:
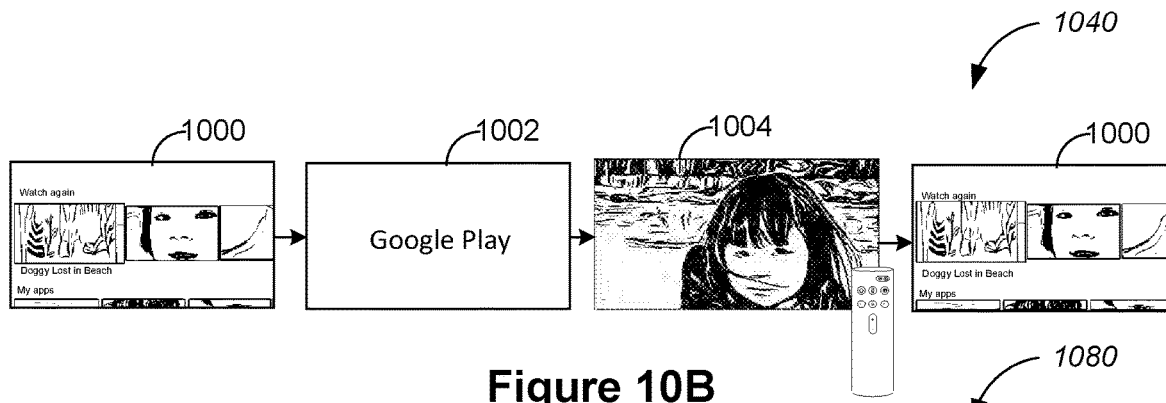
FIGS. 10B and 10C are two example sequences of user interfaces that are displayed on a network-connected TV device sequentially in response to user actions on a remote control device coupled to the network-connected TV device in accordance with some implementations.
Figure 10C:
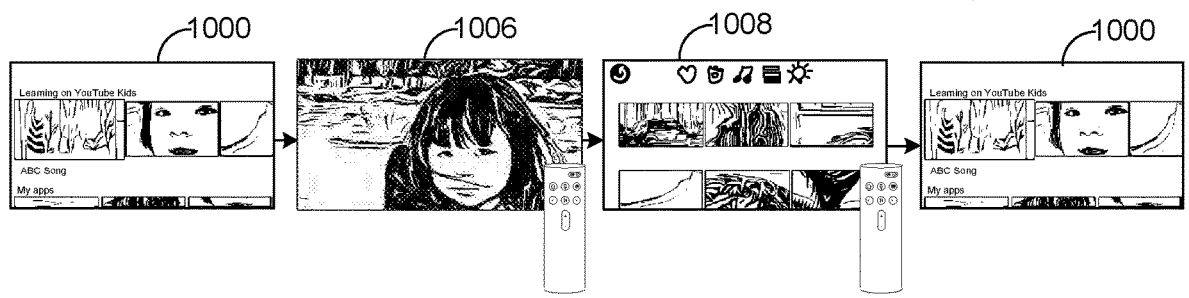

FIG. 10A is an example unified user interface 1000 displayed on a network-connected TV device 102 at a restricted mode in accordance with some implementations. FIGS. 10B and 10C are two example sequences of user interfaces 1040 and 1080 that are displayed on a network-connected TV device 102 sequentially in response to user actions on a remote control device 114 coupled to the network-connected TV device 102 in accordance with some implementations, respectively. In the restricted mode, the content selection criterion defines an age-based content rating, and first media content items corresponding to a plurality of selectable information items displayed on the unified user interface 1000 comply with the age-based content rating. For example, a kid zone may be created in a corresponding unified TV application 202. In some implementations, a first content provider is configured to provide one or more second media content items each of which distinct from the first media content items corresponding to the selectable information items displayed on the unified user interface 1000. The one or more second media content items can be played by a first media player application associated with the first content provider in the normal mode, but are prohibited from being played by the local content casting application 902 in the restricted mode.

In some implementations, the unified TV application 202 loads a criterion setting user interface, and receives, on the criterion setting user interface, an input of an age of a kid associated with a user account associated with the unified TV application 202. The unified TV application 202 is configured to automatically identify the age-based content rating based on the input of the age of the kid. While operating in the restricted mode, the server system 104 identifies the age-based content rating defined based on the age of the kid, and selects a plurality of selectable information items according to the age-based content rating for display on the unified user interface 1000, thereby creating a kid-friendly media environment on the TV device 102.

As explained above, in the restricted mode, an ordered subset of unique programs 214 is determined at least partially based on the content filtering criterion. The selectable information items displayed on the TV device 102 correspond to the ordered subset of unique programs 214, and are selected from program information 210 associated with one or more media player applications 204 according to the content selection criterion. In some embodiments, the program information 210 associated with one or more media player applications 204 includes a plurality of characteristic fields, e.g., an age rating field, for each media content item or program. The recommendation engine 212 compares an value of the age rating field with the age-based content rating to decide whether the corresponding media content item or program complies with the content selection criterion defining the age-based content rating.

Further, in some implementations, a first selectable information item is selected from first program information associated with the first media player application according to the content selection criterion, and the first program information is at least partially provided by an information source distinct form the first media player application. For example, the first media player application (e.g., HBO) does not have a kid zone, and corresponding program information 210 of media content items provided thereby does not include the age rating field and may not be used to determine whether the media content items comply with the age-based content rating. As a solution, the recommendation engine 212 may extract the program information 210 from another information source distinct form the first media player application to determine whether the media content items provided via the first media player application comply with the age-based content rating.

Referring to FIG. 10B, in some implementations, when the unified user interface 1000 is displayed on the network-connected TV device 102 to present the plurality of selectable information items, the TV device 102 receives a user selection of a first selectable information item, e.g., via a remote control device 114. In response to the user selection, the TV device 102 initiates playback of a first media content item corresponding to the first selectable information item. In an example, the TV device 102 sequentially displays a splash image frame 1002 indicating that the first media content item is provided by a first media content provider and frames of the first media content item 1004. Referring to FIG. 10C, in some circumstances, the TV device 102 responds to the user selection of the first selectable information item by initiating playback of the first media content item 1006 corresponding to the first selectable information item without displaying the splash image frame 1002.

When the first media content item is played on the TV device 102, the TV device 102 receives a user request to stop playback of the first media content item, e.g., via the remote control device 114. In some implementations (FIG. 10B), in accordance with a determination that the unified TV application 202 operates in the restricted mode, the TV device 102 aborts displaying the first media content item, and re-displays a plurality of clusters with the selectable information items (i.e., the unified user interface 1000). Alternatively, in some implementations (FIG. 10C), in accordance with a determination that the unified TV application 202 operates in the restricted mode, the TV device 102 aborts displaying the first media content item and displays a home user interface 1008 of the first media player application in response to the user request. Further, in response to an additional user request, the TV device 102 exits the home user interface and re-displays a plurality of clusters with the selectable information items (i.e., the unified user interface 1000). Conversely, in accordance with a determination that the unified TV application operates in the normal mode, the TV device 102 aborts displaying the first media content item, and implements one of re-displaying the plurality of clusters on the unified user interface 1000 and displaying the home user interface 1008 of the first media player application.

Figure 11:
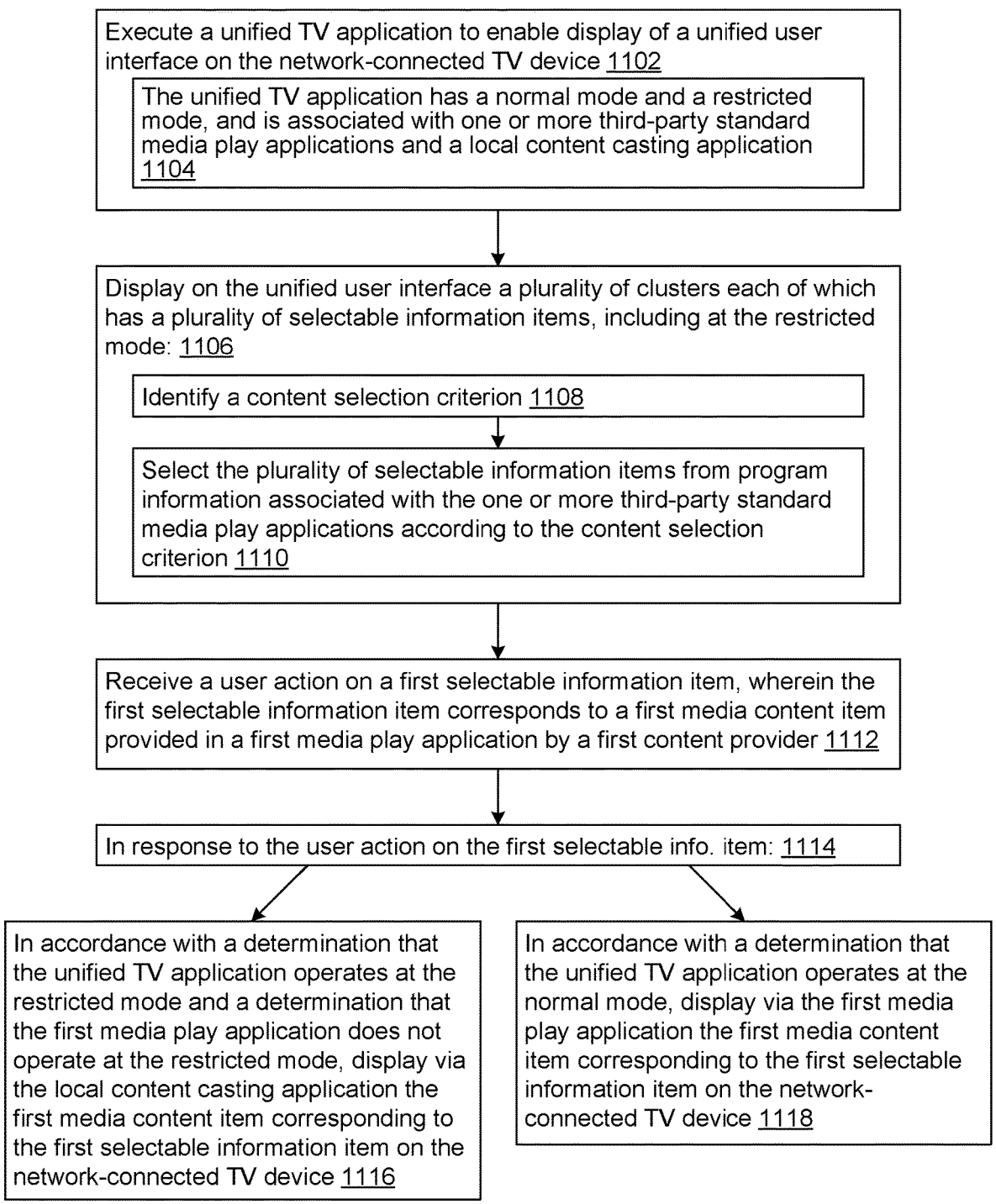
FIG. 11 is an example flow chart of a method of presenting selected media content provided by a media player application on a network-connected TV device in accordance with some implementations.

FIG. 11 is an example flow chart of a method 1100 of presenting selected media content provided by a media player application on a network-connected TV device 102 in accordance with some implementations. Method 1100 is performed by the network-connected TV device 102 and is, optionally, governed by instructions that are stored in a non-transitory computer readable storage medium and that are executed by one or more processors of the network-connected TV device 102. Each of the operations shown in FIG. 5 may correspond to instructions stored in a computer memory or non-transitory computer readable storage medium (e.g., a memory 1506 of the network-connected TV device 102 in FIG. 15). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the method 1100 may be combined and/or the order of some operations may be changed.

The TV device 102 is linked to a user account in a virtual user domain hosted by a server system 104. The TV device 102 executes (1102) a unified TV application 202 to enable display of a unified user interface 1000 on the network-connected TV device. The unified TV application 202 has (1104) a normal mode and a restricted mode, and is associated with one or more standard media player applications 204 and a local content casting application 902. A plurality of clusters is displayed (1106) on the unified user interface 1000. Each cluster has a plurality of selectable information items. The TV device 102 identifies (1108) a content selection criterion, and selects (1110) the plurality of selectable information items from program information 210 associated with the one or more media player applications 204 according to the content selection criterion.

The TV device 102 receives (1112) a user action on a first selectable information item corresponding to a first media content item provided in a first media player application by a first content provider. In response to the user action on the first selectable information item (1114), in accordance with a determination that the unified TV application operates at the restricted mode and a determination that the first media player application does not operate at the restricted mode, the TV device 102 display (1116) via the local content casting application the first media content item corresponding to the first selectable information item on the network-connected TV device. Alternatively, in response to the user action on the first selectable information item (1114), in accordance with a determination that the unified TV application operates at the normal mode, the TV device 102 display (1118) via the first media player application the first media content item corresponding to the first selectable information item on the network-connected TV device 102.

In some implementations, the first content provider is configured to provide one or more second media content items each of which is distinct from a plurality of media content items corresponding to the plurality of selectable information items. The first media player application is configured to play the one or more second media content items in the normal mode. The one or more second media content items are prohibited from being played by the local content casting application at the restricted mode.

Figure 12:
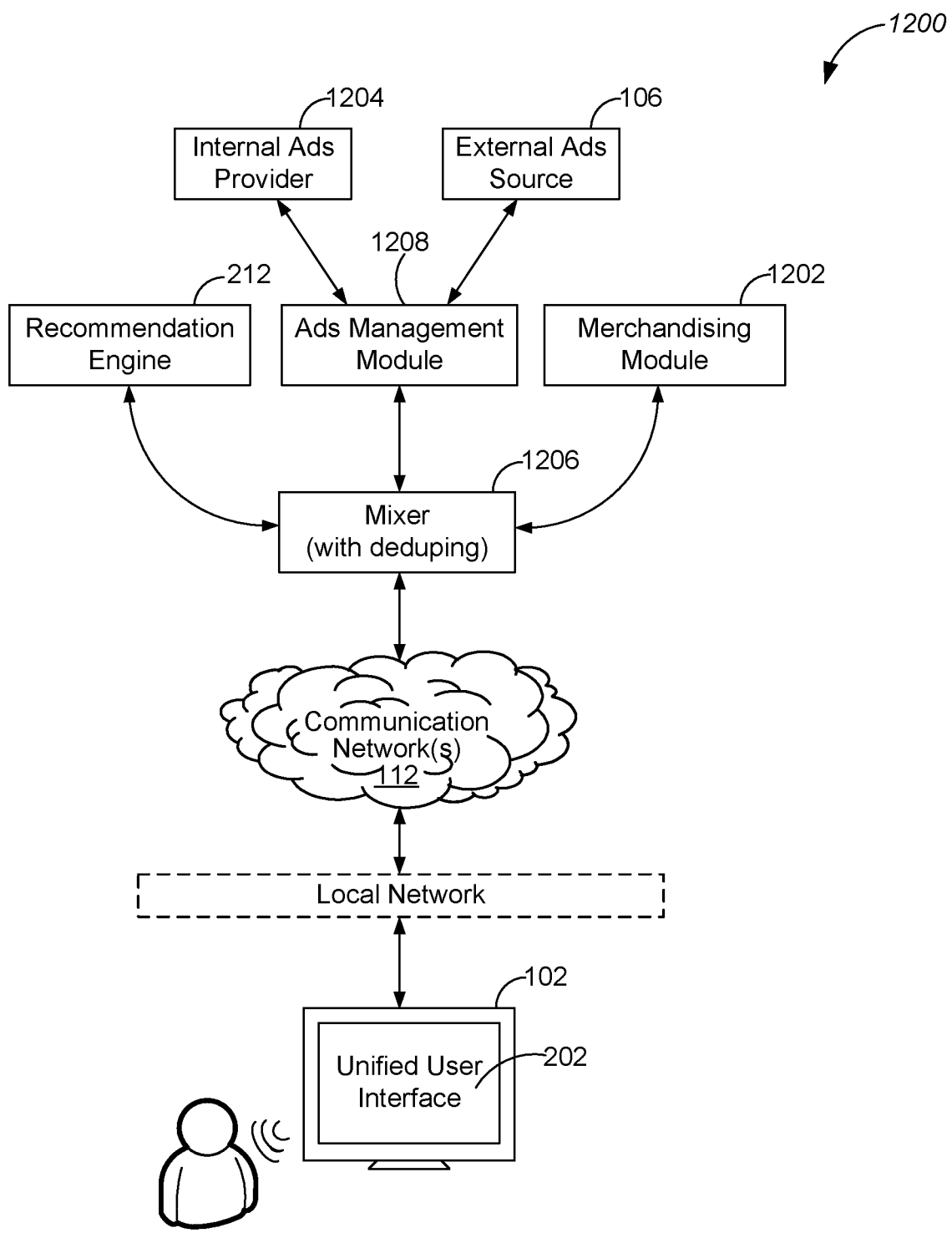
FIG. 12 is an example operating environment where focus items (also called tiles) provided by a recommendation engine, one or more advertisement (ads) providers, and a merchandising module are mixed for display on a network-connected TV device in accordance with some implementations.

FIG. 12 is an example operating environment 1200 where focus items (also called tiles) provided by a recommendation engine 212, one or more advertisement (ads) providers, and a merchandising module 1202 are mixed for display on a network-connected TV device 102 in accordance with some implementations. The one or more ads providers include internal ads providers 1204 that are hosted and managed by the server system 104 and/or external third-party ads sources 106 that are not hosted by the server system 104. An ads management module 1208 is coupled to the one or more ads providers, and configured to manage advertisement content provided by the one or more ads providers. The recommendation engine 212 is configured to compare a multi-dimensional unified user activity characteristic 208 to program information 210 for a plurality of unique programs provided by media content sources 204 to identify an ordered subset of the unique programs 214 to recommend to a user via the unified TV application 202. Particularly, the recommendation engine 212 can recommend media content provided by broadcasting services (television, satellite or cable) and video-on-demand (VOD) content providers to target at a user of the TV device 102 based on the user activity characteristic 208. The merchandising module 1202 is hosted and managed by the server system 104 and is configured to provide focus items selected by the server system 104 for promotion. The focus items selected by the merchandising module 1202 is optionally independently of the user activity characteristic 208 or determined based on the user activity characteristic 208 of a user. In some implementations, the focus item selected by the merchandising module 1202 is an advertisement soliciting the user for subscribing to service provided by an SVOD content provider, purchasing or renting certain media content, or playing an online game. For example, the focus items selected by the merchandising module 1202 includes a trailer clip related to a newly released movie. In some implementations, the focus items selected by the merchandising module 1202 is provided by a TVOD content provider independently of the user activity characteristic 208 of any specific user (i.e., the focus items are associated with the TVOD content provider and pushed to the TV device 102 by the merchandising module 1202). Alternatively, in some situations, the focus items selected by the merchandising module 1202 is determined by the server system 104 based on the user activity characteristics 208 of a number of users across different use cases in the virtual user domain hosted by the server system 104. In an example, each of the focus items selected by the merchandising module 1202 is determined based on one or more of: a content type/format, a content quality, a recency, a popularity, a seasonality, and an application lifecycle of the respective focus item.

Referring to FIG. 3, the unified TV application 202 is executed to enable display of a unified user interface 300 on the network-connected TV device 102, and the unified user interface 300 has a focus area 362 (e.g., a prominently displayed area of the user interface) configured to display a plurality of focus items. The focus area 362 is optionally located on a top half area of the unified user interface 300. The plurality of focus items is displayed in the focus area 362 sequentially according to a temporal order. Optionally, the plurality of focus items is temporally organized as a carousel, smoothly transitioning to a start focus item after an end focus item is displayed. Each focus item is associated with a respective focus item provider selected from a merchandising module 1202, an ads management module 1208, and a media recommendation engine 212. The server system 104 includes a mixer 1206 configured to automatically mix the plurality of focus items sequentially according to the temporal order. In some implementations, the focus area 362 expands to partially overlap a subset of the selectable information items 302-332. In an example, the focus area 362 covers the entire unified user interface 300 and overlaps all of the selectable information items 302-332. That said, a subset or all of the selectable information items 302-332 are displayed on a background of the focus area 362, and the plurality of focus items are displayed sequentially on the background for the subset or all of the selectable information items 302-332.

Additionally, the ads management module 1208 of the server system 104 further includes an ads conversion module (not shown in FIG. 12) configured to customize media content items received from an external ads source 106 for display in the focus area 362 of the unified user interface 300. For example, the plurality of focus items includes a first focus item. The TV device 102 sends to a first advertiser server 106 a request for the first focus item, and the request includes information of a plurality of predefined user interface elements of the focus area of the unified user interface. In response to the request, the TV device 102 receives from the first advertiser server 106 a plurality of media content items associated with the first focus item and consolidates the plurality of media content items to the first focus item for display on the focus area during a time slot corresponding to the first focus item. In some implementations, the plurality of media content items includes a subset of media content items that comply with a Video Ad Serving Template (VAST) standard for communication requirements between the first advertiser server and the network-connected TV device. As such, the ads conversion module of the ads management module 1208 is configured to consolidate the subset of content items to the first focus item and customize the first focus item for display on the unified user interface 3000 of the network-connected TV device 102.

Examples of the predefined user interface elements of the focus area 362 includes one or more of: a background image, a stylized title/logo image, description including a catch phrase, a call to action, title text, an application name, a source label, a package name, a click through link, and a video clip. The background image may include image of characters free of any text. The request for the first focus item sent to the first advertiser server defines what section of the image of characters needs to be kept empty for putting the title. In some implementations, the logo image is necessary, while a stylized font is optional, and a one line description of media content associated with the first focus item is promoted. The call to action includes actions selectable for the first focus item, e.g., "Subscribe Now," "Available for Rent," "Watch Now," Needs Subscription," "In Theatres Soon," "Add App to Favorites Row," and Add Channels to Home Screen," and the server system 104 associates the first focus item with a subset of the selectable actions. The title text is used when the stylized title is not available. The first focus item carries the source label highlighting to the user of the TV device 102 whether the content is an advertisement, merchandised unit, or recommendation. The click through link includes a link to an application, content in an application, or commercial webpage associated with the first focus item, and a click on the first focus item automatically results in an activation of the link.

In an example, the first focus item includes a static advertising image of a movie that is being shown on a theater, and the first focus item includes a link 364 to buy a ticket and/or a link 366 to preorder a digital versatile disc (DVD). In some implementations, the static advertising image shows "Now available on DVD . . . " and has a link to rent a DVD of the corresponding movie.

In some implementations, the plurality of focus items includes a video clip or a static image configured to highlight a media content item provided by a broadcasting television service, a broadcasting satellite service, a cable service, an SVOD content provider, or an AVOD service. The recommendation engine 212 of the server system 104 identifies the multi-dimensional user activity characteristic 208 of a user of the network-connected TV device 102, obtains program information 210 associated with the plurality of media player applications 204, and identifies the highlighted media content item to recommend to the user via the unified TV application. Specifically, the highlighted media content item is displayed to the user of the TV device 102 in the focus area 362 of the unified user interface 300. Information of the highlighted media content can be further provided to the recommendation engine 212 to update the multi-dimensional user activity characteristic 208 and subsequent recommendations of media content items.

In some implementations, the plurality of focus items sequentially displayed in the focus area 362 further includes a second focus item, and the second focus item includes a video clip or a static image configured to highlight a media content item provided by a TVOD content provider. The video clip or static image is displayed during a time slot corresponding to the second focus item. In response to a user action on the displayed video clip or static image, a TVOD media application is executed to allow the user to order and play the media content item corresponding to the second focus item. Under some circumstances, this video clip or static image is sponsored by the TVOD content provider or selected by the server system 104 to promote the corresponding media content item, independently of the user activity characteristic 208 of the user of the network-connected TV device 102.

Referring to FIG. 3, in some implementations, the plurality of focus items is concurrently displayed with a plurality of selectable information items organized in clusters. While the selectable information items of each cluster are distributed in parallel with a first axis 344, the focus area and the plurality of clusters are distributed along a second axis 346 of the unified user interface 300 that is distinct from the first axis 344. The focus area is fixed on the unified user interface 300, independently of display of the plurality of selectable information items on a non-focus area that is distinct from and does not overlap the focus area. Specifically, the focus items are displayed in the fixed focus area regardless of whether the selectable information items are moved within the non-focus area, enter or leave the non-focus area. In some implementations, a plurality of focus item indicators 368 is displayed in conjunction with the focus items. Each focus item indicator 368 represents a respective one of the plurality of focus items. For each of the plurality of focus items, in accordance with a determination that the respective focus item is displayed in the focus area, the TV device 102 displays the respective focus item indicator according an active specification 370a. In accordance with a determination that the respective focus item is not displayed in the focus area, the TV device 102 displays the respective focus item indicator according an inactive specification 370b distinct from the active specification 370a.

In some situations, while one of the plurality of focus items is displayed in the focus area 362, the TV device 102 receives a predefined user action (e.g., a click on a Previous or Next button on the remote control device 114) associated with the respective focus item. In response to the predefined user action, the TV device 102 aborts displaying the respective focus item and displays in the focus area of the unified user interface (1) a subsequent focus item that follows the respective focus item in the temporal order or (2) a preceding focus item that precedes the respective focus item in the temporal order.

The focus items are often updated in the focus area 362 to keep their freshness. For example, the server system 104 determines a number of times for which the plurality of focus items has been displayed in the focus area 362 sequentially according to the temporal order. In accordance with a determination that the number of times is equal to or greater than a predetermined playing threshold (e.g., 2 times), the server system 104 replaces at least one of the plurality of focus items with an alternative focus item.

Additionally, in some implementations, the server system 104 is configured to de-duplicate the focus items displayed sequentially in the focus area 362. The plurality of focus items includes a second focus item in addition to the first focus area. The mixer 1206 receives two or more original items each of which is from a distinct content provider selected from the merchandising module 1202, the advertiser 106, and the media recommendation engine 212. The mixer 1206 de-duplicates the two or more original items to result in the second focus item according to a preferred order of the merchandising module 1202, the advertiser 106, and the media recommendation engine 212. In an example, the preferred order defines that decreasing preferences of the advertiser 106, the merchandising module 1202 and the media recommendation engine 212, which prioritizes the advertiser 106 over any other content sources.

In some embodiments, information of a user action associated with the focus area is provided to one of the recommendation engine 212, ads management module 1208 and merchandising module 1202 that provides the focus item displayed in the focus area. The information of the user action indicates a user preference of the user of the network-connected TV device 102 concerning the plurality of focus items displayed in the focus area. Each of the recommendation engine 212, ads management module 1208 and merchandising module 1202 may determine one or more additional focus items for the user based on the user preference of the user or based on user preferences of a plurality of users that is related to the user of the network-connected TV device 102.

FIG. 13 is an example flow chart of a method 1300 of mixing focus content (including a VAST-based advertisement) on a network-connected TV device 102 in accordance with some implementations. Method 1300 is performed by a server system 104 and is, optionally, governed by instructions that are stored in a non-transitory computer readable storage medium and that are executed by one or more processors of the server system 104. Each of the operations shown in FIG. 13 may correspond to instructions stored in a computer memory or non-transitory computer readable storage medium (e.g., a memory 1406 of the server system 104 in FIG. 14A). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the method 1300 may be combined and/or the order of some operations may be changed.

The server system 104 hosts a virtual user domain including a user account. The user account is associated (1302) with a unified TV application 202 and a plurality of media player applications 204. The unified TV application 202 is associated (1304) with a network-connected TV device 102 and is configured to enable display of media content on the TV device 102, and each of the plurality of media player applications 204 is configured to display media content provided by a respective content provider 110. The unified TV application 202 is executed (1306) to enable display of a unified user interface on the network-connected TV device 102. The unified user interface 300 has a focus area 362 configured to display a plurality of focus items. The plurality of focus items (also called tile) is displayed (1308) in the focus area 362 sequentially according to a temporal order, e.g., like in a carousel. Each focus item is associated with a respective focus item provider selected from a merchandising module, an advertiser, and a media recommendation engine.

The plurality of focus items includes a first focus item. The server system 104 sends (1310) to a first advertiser server a request for the first focus item. The request includes information of a plurality of predefined user interface elements of the focus area of the unified user interface. In response to the request, the server system 104 receives (1312) from the first advertiser server a plurality of media content items associated with the first focus item and consolidates the plurality of media content items to the first focus item for display on the focus area 362 during a time slot corresponding to the first focus item.

It should be understood that the particular order in which the operations in each of FIGS. 4, 5, 11 and 13 have been described are merely exemplary and are not intended to indicate that the described order is the only order in which the operations could be performed. One of ordinary skill in the art would recognize various ways to display information items and focus content in a unified user interface as described herein. Additionally, it should be noted that details described with respect to one of processes 400, 500, 1100 and 1300 are also applicable in an analogous manner to any other ones of the methods 400, 500, 1100 and 1300. For brevity, the analogous details are not repeated.

Figure 14A:
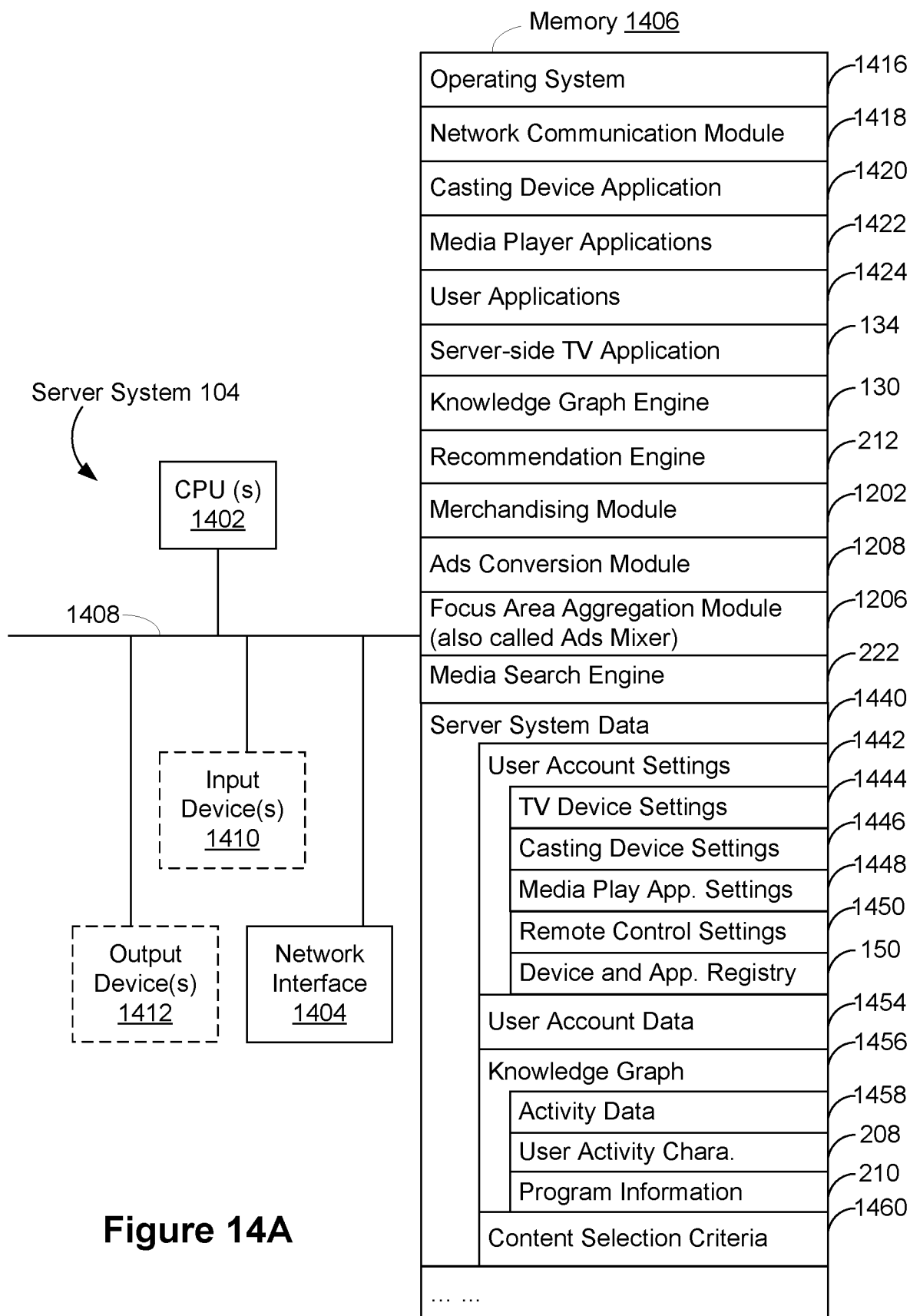
FIG. 14A is a block diagram illustrating a server system of a media environment in accordance with some implementations.

FIG. 14A is a block diagram illustrating a server system 104 of a media environment in accordance with some implementations. The server system 104, typically, includes one or more processing units (CPUs) 1402, one or more network interfaces 1404, memory 1406, and one or more communication buses 1408 for interconnecting these components (sometimes called a chipset). The server system 104 could include one or more input devices 1410 that facilitate user input, such as a keyboard, a mouse, a voice-command input unit or microphone, a touch screen display, a touch-sensitive input pad, a gesture capturing camera, or other input buttons or controls. Furthermore, the server system 104 could use a microphone and voice recognition or a camera and gesture recognition to supplement or replace the keyboard. In some implementations, the server system 104 includes one or more cameras, scanners, or photo sensor units for capturing images, for example, of graphic series codes printed on the electronic devices. The server system 104 could also include one or more output devices 1412 that enable presentation of user interfaces and display content, including one or more speakers and/or one or more visual displays.

Memory 1406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1406, optionally, includes one or more storage devices remotely located from one or more processing units 1402. Memory 1406, or alternatively the non-volatile memory within memory 1406, includes a non-transitory computer readable storage medium. In some implementations, memory 1406, or the non-transitory computer readable storage medium of memory 1406, stores the following programs, modules, and data structures, or a subset or superset thereof:

- Operating system 1416 including procedures for handling various basic system services and for performing hardware dependent tasks;
- Network communication module 1418 for connecting the server system 104 to other devices (e.g., various servers in the server system 104, ads sources 106, EPG source 108, media content sources 110, network-connected TV device 102, remote control devices 114, media devices 114-126, assistance devices 138, home devices 140, and mobile devices) via one or more network interfaces 1404 (wired or wireless) and one or more networks 112, such as the Internet, other wide area networks, local area networks, metropolitan area networks, and so on;
- Casting device application 1420 that is executed to provide server-side functionalities for device provisioning, device control, and user account management associated with casting device(s) 118;
- One or more internal media player applications 1422 (e.g., YouTube and Google Play) that are executed to provide server-side functionalities for media display and user account management;
- One or more user applications 1424 including one or more of an Internet search engine, a mapping application, a social media application, a retailer application, and a device application that is executed to provide server-side functionalities for device provisioning, device control, data processing and data review of a corresponding assistance device 138 or home device 140; and
- Server-side TV application 134 executed to provide server-side functionalities for device provisioning, device control, data processing and data review of the network-connected TV device 102;
- Knowledge graph engine 130 that is executed to collect activity data from media player applications and user applications associated with a user account, compute a multi-dimensional unified user activity characteristic 208 based on the collected activity data, and collect program information (de-duplicated or not) associated with the media player applications 204;
- Recommendation engine 212 that is executed to compare the user activity characteristic 208 to the program information 210 for a plurality of unique programs to identify an ordered subset of the unique programs 214 to recommend to a user via the unified TV application 202;
- Merchandising module 1202 executed to provide focus items selected to promote media content independently of the user activity characteristic 208 of an individual user account;
- An ads management module 1208 executed to manage advertisement content provided by an internal ads provider 1204 or an external ads source 106, including an ads conversion module that is executed to customize media content items received from an external ads source 106 for display in the focus area 362 of the unified user interface 3000, e.g., according to a customized VAST format;
- Mixer 1206 (also called a focus item aggregation module) that is executed to mix a plurality of focus items provided by two or more content sources (e.g., the recommendation engine 212, the merchandising module 1202, and ads providers 1204 or 106) sequentially according to a temporal order; and
- Media search engine 222 that is executed to receive a search query from the server-side TV application 134 or casting service module 136 and identify one or more media content items from the program information of programs or content items provided by the media content sources 110; and
- Server system data 1440 storing at least data associated with control of media display on the network-connected TV device 102, including:
  - User account settings 1442 for storing account settings of one or more user accounts and settings of devices and applications that are associated with each of the user accounts and managed by the server system 104, further including:
    - TV device settings 1444 for storing information associated with the TV device 102, including common device settings (e.g., service tier, device model, storage capacity, processing capabilities, communication capabilities, etc.), and information associated with a corresponding unified TV application 202 (including one or more of account access information, user preferences of media content types, and viewing history data);
    - Casting device settings 1446 for storing information associated with a casting device 118 and user accounts of the casting device application 1420, including one or more of account access information, information for device settings (e.g., service tier, device model, storage capacity, processing capabilities, communication capabilities, etc.);
    - Media player application settings 1448 for storing information associated with user accounts of one or more media player applications 204, including one or more of account access information, user preferences of media content types, and viewing history data;

Remote control settings 1450 for storing information associated with one or more remote control devices 114, e.g., common device settings (e.g., service tier, device model, storage capacity, processing capabilities, communication capabilities, etc.), media control functions linked to individual buttons, and commands and data for implementing each of the media content functions; and Device and application registry 150 for storing information of one or more user accounts managed by the server system 104 and information of user devices and applications associated with each of the one or more user accounts;

User account data 1454 for storing data that are generated by various applications of a plurality of devices associated with each of the user accounts managed by the server system 104, e.g., display information associated with media content currently displayed on the TV device 102;

Knowledge graph data 1456 associated with a knowledge graph engine 130 implemented by the server system 104, including one or more of: activity data 1458 of the unified TV application 202, media player applications 204, and user applications 1424; a multi-dimensional unified user activity characteristic 208 derived from the activity data; and program information 210 associated with the plurality of media player applications 204; and One or more content selection criteria 1460 applied by the unified TV application 202 to control media content displayed on the TV device 102.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1406, optionally, stores a subset of the modules and data structures identified above. Furthermore, memory 1406, optionally, stores additional modules and data structures not described above.

FIG. 14B is an example device and application registry 150 of a server system 104 that stores information of one or more user accounts managed by the server system 104 and information of user devices and applications associated with each of the one or more user accounts in accordance with some implementations. In this example, a user account 1482 is defined according to an email address (e.g., abc@gmail.com) and associated with a plurality of user devices including casting devices 118 (e.g., Google Chromecast), a surveillance camera 148 (e.g., Nest Camera) and a remote control device 114. The device and application registry 150 stores one or more of a device identification (ID), a device type, a device manufacturer ID and an Internet protocol (IP) address for each user device associated with the user account. The device IDs are assigned to the user devices when the user devices are linked to the user account 1482. The manufacturer IDs includes product serial numbers provided by manufacturers to identify the user devices uniquely. When each user device is being linked to the user account 1482, the respective manufacturer ID is requested for the purposes of authenticate the respective user device. The IP addresses of the user devices are applied to track the location of the user devices in the Internet. They are acquired during the course of linking the user devices to the user account 1482, and updated when locations of the user devices are changed in the Internet.

In some implementations, a first user device associated with the user account 1482 is linked to a second user device associated with the user account 1482. For example, the remote control device 114 (Device ID=10) is linked to the network-connected TV device 102 (Device ID=11), but not to the casting device 118 (Device ID=1). In some implementations, the user account 1482 includes two or more remote control devices 114, each of the remote control devices 114 is uniquely linked to a specific network-connected TV device 102 or casting device 118. In some implementations, the user account 1482 includes one remote control device 114 that are linked to more than one casting or TV device according to a predetermined linking rule (e.g., according to a distance of the remote control device 114 to any one of the more than one casting or TV device).

In some implementations, the user account 1482 defined according to the email address (e.g., abc@gmail.com) is also associated with the unified TV application 202, a plurality of media player applications 204 and a plurality of user applications 1424. Each of the media player applications 204 is configured to display media content items or programs provided by a broadcasting service (television, satellite or cable) and a VOD content provider. The VOD content provider is optionally the server system 104 or a third-party content provider distinct from the server system 104. Examples of the media player applications 204 include, but are not limited to, YouTube, Google Play, Netflix, Hulu, Amazon Prime, HBO, and some TV channel applications (e.g., ESPN, NBC, ABC and PBS). Conversely, examples of the plurality of user applications 1424 include an email application (e.g., Google Gmail), a map application (e.g., Google Map), an assistance application (e.g., Google Assistance), a home device application (e.g., Nest Camera, Nest Hello), and an online retailer application (e.g., Google Shopping). Optionally, each media player or user application is stored with one or more of: an application identification (ID), an application type, a flag indicating whether this is a first-part or third-party application, and entitlement/subscription information (e.g., membership type, credentials).

Figure 15:
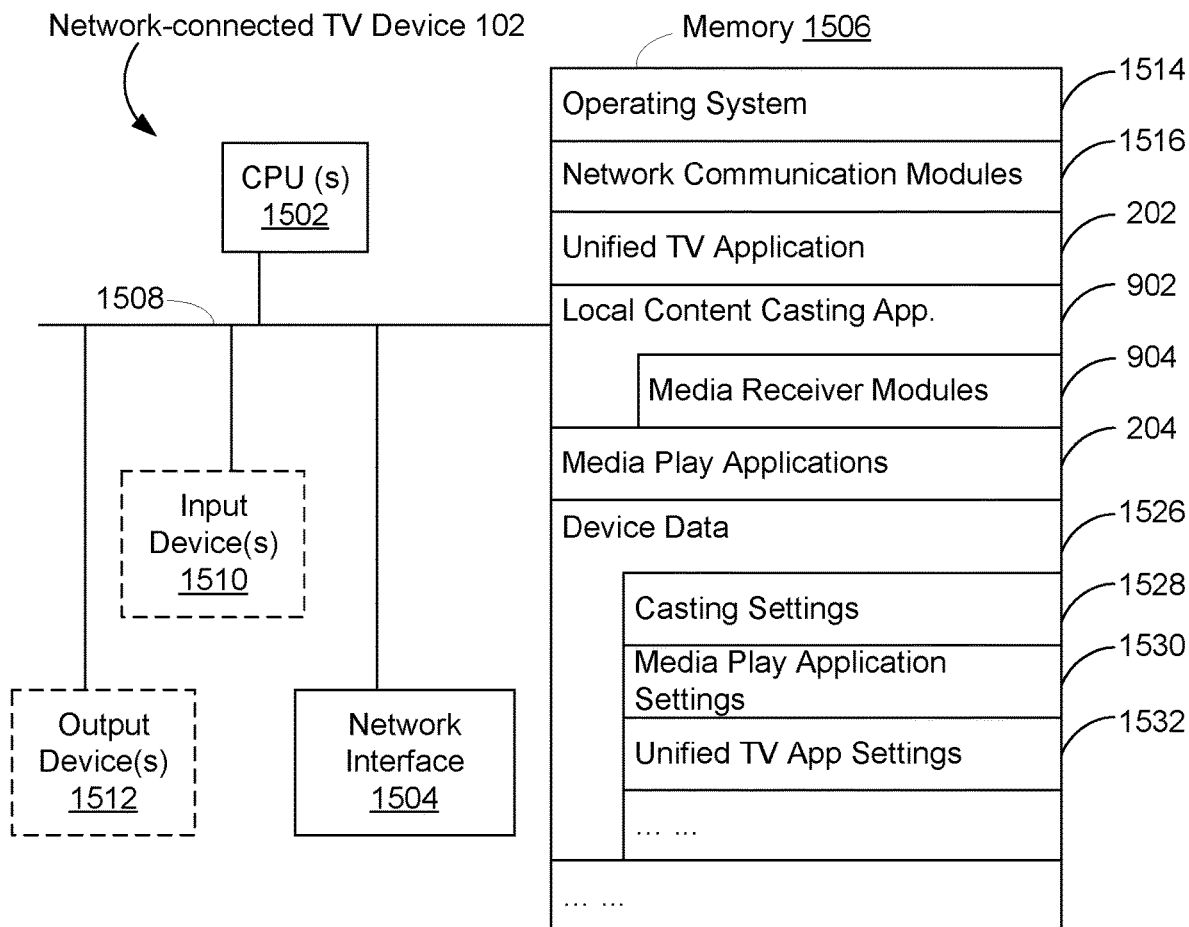
FIG. 15 is a block diagram illustrating an example network-connected TV device configured to display a unified user interface and media content provided by media player applications in accordance with some implementations.

FIG. 15 is a block diagram illustrating an example network-connected TV device 102 configured to display a unified user interface and media content provided by media player applications 204 in accordance with some implementations. The network-connected TV device 102, typically, includes one or more processing units (CPUs) 1502, one or more network interfaces 1504, memory 1506, and one or more communication buses 1508 for interconnecting these components (sometimes called a chipset). Memory 1506 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1506, optionally, includes one or more storage devices remotely located from one or more processing units 1502. Memory 1506, or alternatively the non-volatile memory within memory 1506, includes a non-transitory computer readable storage medium. The TV device 102 could include one or more input devices 1510 that facilitate user input, such as input buttons or controls.

Furthermore, the TV device 102 could use a microphone and voice recognition or a camera and gesture recognition to supplement or replace the buttons. The TV device 102 could also include one or more output devices 1512 that enable presentation of user interfaces and display content, including a speaker and/or a visual display.

In some implementations, memory 1506, or the non-transitory computer readable storage medium of memory 1506, stores the following programs, modules, and data structures, or a subset or superset thereof:

- Operating system 1514 including procedures for handling various basic system services and for performing hardware dependent tasks;
- Network communication module 1516 for connecting the network-connected TV device 102 to other computers or systems (e.g., the server system 104, media content sources 110, remote control devices 114) via one or more network interfaces 1504 (wired or wireless) and one or more networks 112, such as the Internet, other wide area networks, local area networks, metropolitan area networks, cable television systems, satellite television systems, IPTV systems, and so on;
- Unified TV application 202 for presenting a unified user interface 300 with recommended media content and playing media content provided by media content sources 204 in response to a user selection of the recommended media content;
- Local content casting application 902 configured to be called by the unified TV application 202 in a restricted mode for playing media content items selected according to a content selection criterion, including a plurality of media receiver modules 904 each of which corresponds to a respective media content source 110 and is called to bypass a corresponding media player application 204 and play the media content items provided by the respective media content source;
- Media player applications 204 that is executed to provide device-side functionalities for media display and user account management associated with corresponding media content sources 110; and
- Device data 1526 storing at least data associated with control of media display on the TV device 102, including:
  - Casting settings 1528 for storing information associated with user accounts of a casting device application, including one or more of account access information, information for device settings (e.g., service tier, device model, storage capacity, processing capabilities, communication capabilities, etc.), and information for automatic media display control;
  - Media player application settings 1530 for storing information associated with user accounts of the media player applications 204, including one or more of account access information, user preferences of media content types, and viewing history data; and
  - Unified TV application setting 1532 for storing information associated with user accounts of the unified TV application 202, including one or more of account access information, user preferences of media content types, and viewing history data associated with the unified TV application 202.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1506, optionally, stores a subset of the modules and data structures identified above. Furthermore, memory 1506, optionally, stores additional modules and data structures not described above.

It will also be understood that, although the terms first, second, etc. are, in some instances, used herein to describe various elements, these elements should not be limited by these terms. These terms are only used to distinguish one element from another. For example, a first type of audio feature can be termed a second type of audio feature, and, similarly, a second type of audio feature can be termed a first type of audio feature, without departing from the scope of the various described implementations. The first type of audio feature and the second type of audio feature are both types of audio features, but they are not the same type of audio feature.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method of displaying focus content, comprising:
at a server system having one or more processors and memory storing instructions for execution by the one or more processors, wherein the server system hosts a virtual user domain including a user account:
associating the user account with a unified TV application and a plurality of media player applications, wherein the unified TV application is associated with a network-connected TV device and is configured to enable display of media content on the TV device, and each of the plurality of media player applications is configured to display media content provided by a respective content provider;
executing the unified TV application to enable display of a unified user interface on the network-connected TV device, wherein the unified user interface has a focus area that is located at a top portion of the unified user interface and that is configured to display a plurality of focus items, wherein each of the plurality of focus items sequentially occupies an entirety of the focus area when displayed, and wherein the focus area expands to partially overlap a subset of selectable information items included in the unified user interface;
selecting the plurality of focus items based on user activity characteristics of a plurality of users in the virtual user domain hosted by the server system, wherein the plurality of focus items are filtered from a plurality of content items according to entitlement information that indicates whether the user account is entitled to media content provided by media content sources via the plurality of media player applications, and wherein the entitlement information is automatically extracted from each of the plurality of media player applications; and
displaying the plurality of focus items in the focus area sequentially according to a temporal order in which a first focus item from the plurality of focus items is replaced with a second focus item from the plurality of focus items after an end of a particular time period, wherein each focus item is associated with a respective focus item provider selected from a merchandising module, an advertiser, and a media recommendation engine, including:
sending to a first advertiser server a request for the first focus item, the request including information of a plurality of predefined user interface elements of the focus area of the unified user interface; and
in response to the request, receiving from the first advertiser server a plurality of media content items associated with the first focus item and consolidating the plurality of media content items to the first focus item in the unified user interface to be displayed during a time slot corresponding to the first focus item.

2. The method of claim 1, wherein the plurality of predefined user interface elements of the focus area includes one or more of: a background image, a stylized title/logo image, description, a call to action, title text, a source label, a catch phrase, and a video clip.

3. The method of claim 1, wherein:
the plurality of media content items includes a subset of media content items that comply with a Video Ad Serving Template (VAST) standard for communication requirements between the first advertiser server and the network-connected TV device; and
when consolidated to the first focus item, the subset of media content items are customized for display on the network-connected TV device.

4. The method of claim 1, wherein the first focus item includes a static advertising image of a movie that is being shown on a theater, and the first focus item includes a link to buy a ticket and/or a link to preorder a digital versatile disc (DVD).

5. The method of claim 1, wherein the plurality of focus items includes a video clip or a static image configured to highlight a media content item provided by one or more of a broadcasting television service, a broadcasting satellite service, a cable service, a subscription video-on-demand (SVOD) content provider, and an ad-based video-on-demand (AVOD) service, further comprising:
identifying a multi-dimensional user activity characteristic of a user of the network-connected TV device;
obtain program information associated with the plurality of media player applications; and
identifying, by the media recommendation engine, the highlighted media content item to recommend to the user via the unified TV application.

6. The method of claim 1, wherein the plurality of focus items includes a second focus item, and the second focus item includes a video clip or a static image configured to highlight a media content item provided by a transactional video-on-demand (TVOD) content provider, further comprising:
displaying the video clip or static image during a time slot corresponding to the second focus item.

7. The method of claim 1, wherein the focus area is displayed on a top half area of the unified user interface.

8. The method of claim 1, wherein the plurality of focus items is concurrently displayed with a plurality of information items, and the focus area is fixed on the unified user interface, independently of display of the plurality of information items on a non-focus area that is distinct from and does not overlap the focus area.

9. The method of claim 1, further comprising:
displaying a plurality of focus item indicators each of which represents a respective one of the plurality of focus items, further including for each of the plurality of focus items:
in accordance with a determination that the respective focus item is displayed in the focus area, displaying the respective focus item indicator according to an active specification; and
in accordance with a determination that the respective focus item is not displayed in the focus area, displaying the respective focus item indicator according to an inactive specification distinct from the active specification.

10. The method of claim 1, wherein displaying the plurality of focus items in the focus area sequentially according to the temporal order further comprises, for each of the plurality of focus items:
while displaying the respective focus item in the focus area and in response to a predefined user action associated with the respective focus item, aborting the displaying of the respective focus item and displaying in the focus area of the unified user interface (1) a subsequent focus item that follows the respective focus item in the temporal order or (2) a preceding focus item that precedes the respective focus item in the temporal order.

11. A server system, wherein the server system hosts a virtual user domain including a user account, comprising:
one or more processors; and
memory having instructions stored thereon, which when executed by one or more processors cause the processors to implement operations for:
associating the user account with a unified TV application and a plurality of media player applications, wherein the unified TV application is associated with a network-connected TV device and is configured to enable display of media content on the TV device, and each of the plurality of media player applications is configured to display media content provided by a respective content provider;
executing the unified TV application to enable display of a unified user interface on the network-connected TV device, wherein the unified user interface has a focus area that is located at a top portion of the unified user interface and that is configured to display a plurality of focus items, wherein each of the plurality of focus items sequentially occupies an entirety of the focus area when displayed, and wherein the focus area expands to partially overlap a subset of selectable information items included in the unified user interface;
selecting the plurality of focus items based on user activity characteristics of a plurality of users in the virtual user domain hosted by the server system, wherein the plurality of focus items are filtered from a plurality of content items according to entitlement information that indicates whether the user account is entitled to media content provided by media content sources via the plurality of media player applications, and wherein the entitlement information is automatically extracted from each of the plurality of media player applications; and
displaying the plurality of focus items in the focus area sequentially according to a temporal order in which a first focus item from the plurality of focus items is replaced with a second focus item from the plurality of focus items after an end of a particular time period, wherein each focus item is associated with a respective focus item provider selected from a merchandising module, an advertiser, and a media recommendation engine, including:
sending to a first advertiser server a request for the first focus item, the request including information of a plurality of predefined user interface elements of the focus area of the unified user interface; and
in response to the request, receiving from the first advertiser server a plurality of media content items associated with the first focus item and consolidating the plurality of media content items to the first focus item in the unified user interface to be displayed during a time slot corresponding to the first focus item.

12. The server system of claim 11, wherein the plurality of predefined user interface elements of the focus area includes one or more of: a background image, a stylized title/logo image, description, a call to action, title text, a source label, a catch phrase, and a video clip.

13. The server system of claim 11, further comprising:
determining a number of times for which the plurality of focus items has been displayed in the focus area sequentially according to the temporal order; and
in accordance with a determination that the number of times is equal to or greater than a predetermined playing threshold, replacing at least one of the plurality of focus items with an alternative focus item.

14. The server system of claim 11, wherein the plurality of focus items includes a second focus item, further comprising:
receiving two or more original items each of which is from a distinct content provider selected from the merchandising module, the advertiser, and the media recommendation engine; and
de-duplicating the two or more original items to result in the second focus item according to a preferred order of the merchandising module, the advertiser, and the media recommendation engine.

15. The server system of claim 14, wherein the preferred order defines that decreasing preferences of the advertiser, the merchandising module, and the media recommendation engine.

16. A non-transitory computer-readable medium, having instructions stored thereon, which when executed by one or more processors cause the one or more processors to implement operations for, at a server system hosting a virtual user domain including a user account:
associating the user account with a unified TV application and a plurality of media player applications, wherein the unified TV application is associated with a network-connected TV device and is configured to enable display of media content on the network-connected TV device, and each of the plurality of media player applications is configured to display media content provided by a respective content provider;
executing the unified TV application to enable display of a unified user interface on the network-connected TV device, wherein the unified user interface has a focus area that is located at a top portion of the unified user interface and that is configured to display a plurality of focus items, wherein each of the plurality of focus items sequentially occupies an entirety of the focus area when displayed, and wherein the focus area expands to partially overlap a subset of selectable information items included in the unified user interface;
selecting the plurality of focus items based on user activity characteristics of a plurality of users in the virtual user domain hosted by the server system, wherein the plurality of focus items are filtered from a plurality of content items according to entitlement information that indicates whether the user account is entitled to media content provided by media content sources via the plurality of media player applications, and wherein the entitlement information is automatically extracted from each of the plurality of media player applications; and
displaying the plurality of focus items in the focus area sequentially according to a temporal order in which a first focus item from the plurality of focus items is replaced with a second focus item from the plurality of focus items after an end of a particular time period, wherein each focus item is associated with a respective focus item provider selected from a merchandising module, an advertiser, and a media recommendation engine, including:
sending to a first advertiser server a request for the first focus item, the request including information of a plurality of predefined user interface elements of the focus area of the unified user interface; and
in response to the request, receiving from the first advertiser server a plurality of media content items associated with the first focus item and consolidating the plurality of media content items to the first focus item in the unified user interface to be displayed during a time slot corresponding to the first focus item.

17. The non-transitory computer-readable medium of claim 16, wherein the plurality of predefined user interface elements of the focus area includes one or more of: a background image, a stylized title/logo image, description, a call to action, title text, a source label, a catch phrase, and a video clip.

18. The non-transitory computer-readable medium of claim 16, wherein the merchandising module is hosted and managed by the server system and is configured to provide focus items selected by the server system for promotion, and one of the plurality of focus items is selected by the merchandising module and configured to solicit a user for subscribing to service provided by an SVOD content provider, purchasing or renting media content, or playing an online game.

19. The non-transitory computer-readable medium of claim 16, wherein one of the plurality of focus items is provided for promotion by the merchandising module based on one or more of a content type/format, a content quality, a recency, a popularity, a seasonality, and an application lifecycle associated with the one of the plurality of focus items.

* * * * *

UNITED STATES PATENT AND TRADEMARK OFFICE
CERTIFICATE OF CORRECTION

PATENT NO. : 12,010,385 B2
APPLICATION NO. : 16/919931
DATED : June 11, 2024
INVENTOR(S) : Sharma et al.

Page 1 of 1

It is certified that error appears in the above-identified patent and that said Letters Patent is hereby corrected as shown below:

In the Claims

In Column 37, Claim 1, Line 13, after "the" insert --network-connected--.

Signed and Sealed this
Seventh Day of January, 2025

Derrick Brent
*Acting Director of the United States Patent and Trademark Office*